United States Patent
Xiang et al.

(10) Patent No.: US 11,126,305 B2
(45) Date of Patent: Sep. 21, 2021

(54) COMPACT OPTICAL SENSOR FOR FINGERPRINT DETECTION

(71) Applicants: WaveTouch Limited, Hong Kong (CN); WaveTouch Denmark A/S, Taastrup (DK)

(72) Inventors: Peng Xiang, Hong Kong (CN); Jørgen Korsgaard Jensen, London (GB)

(73) Assignees: WaveTouch Limited, Hong Kong (CN); WaveTouch Denmark A/S, Taastrup (DK)

( * ) Notice: Subject to any disclaimer, the term of this patent is extended or adjusted under 35 U.S.C. 154(b) by 0 days.

(21) Appl. No.: 16/883,878

(22) Filed: May 26, 2020

(65) Prior Publication Data
US 2020/0285345 A1 Sep. 10, 2020

Related U.S. Application Data

(63) Continuation of application No. PCT/EP2019/061738, filed on May 7, 2019.

(30) Foreign Application Priority Data

May 7, 2018 (EP) ..................................... 18170996
Jul. 20, 2018 (EP) ..................................... 18184693

(51) Int. Cl.
*G06F 3/042* (2006.01)
*G06K 9/00* (2006.01)
*G02B 27/30* (2006.01)

(52) U.S. Cl.
CPC ........... *G06F 3/0421* (2013.01); *G02B 27/30* (2013.01); *G06K 9/0004* (2013.01);
(Continued)

(58) Field of Classification Search
CPC ...... G06F 3/042–3/0421; G06F 3/0412; G06F 21/32; G06F 2203/0338; G06K 9/00006;
(Continued)

(56) References Cited

U.S. PATENT DOCUMENTS 6,057,540 A * 5/2000 Gordon ................. G06F 3/0213
250/221
8,408,775 B1 4/2013 Coleman
(Continued)

FOREIGN PATENT DOCUMENTS

CN 107437047 A † 12/2017
CN 108960208 A 12/2018
(Continued)

OTHER PUBLICATIONS

Notification of Transmittal of the International Preliminary Report on Patentability dated May 14, 2020 in PCT/EP2019/061738, "Compact Optical Sensor for Fingerprint Detection," (19 pages).
(Continued)

*Primary Examiner* — Sanjiv D. Patel
(74) *Attorney, Agent, or Firm* — Hamilton, Brook, Smith & Reynolds, P.C.

(57) ABSTRACT

The present disclosure relates to an optical sensor for use in an image recognition device, such as a fingerprint detector. The presently disclosed optical sensor has improved light transmittance in a compact and cost-efficient structure. In particular the presently disclosed optical sensor can be placed under a display panel of an electronic device, such as a smartphone. One embodiment relates to an optical sensor system for placement under a display panel for detecting/imaging light returned from a fingerprint on top of the display panel, the optical sensor comprising a microlens structure having a front side with an array of light focusing elements and an opaque back side with an array of optically
(Continued)

transparent apertures aligned with the focusing elements, and a sensor array of optical detectors facing the back side of the microlens structure. The optical sensor system is preferably configured such that light returned from the object can be focused by the microlens structure onto the sensor array through the transparent apertures.

20 Claims, 17 Drawing Sheets

(52) U.S. Cl.
CPC ..... *G06K 9/00046* (2013.01); *G06K 9/00053* (2013.01); *G06F 2203/0338* (2013.01)

(58) Field of Classification Search
CPC ............. G06K 9/00013; G06K 9/0004; G06K 9/00046; G06K 2009/0006; G02B 27/30
See application file for complete search history.

(56) References Cited

U.S. PATENT DOCUMENTS

| | | | |
|---|---|---|---|
| 10,438,044 B2 | 10/2019 | Wu et al. | |
| 2007/0041005 A1 | 2/2007 | Song et al. | |
| 2007/0109438 A1 | 5/2007 | Duparre et al. | |
| 2009/0017914 A1 | 1/2009 | Velu | |
| 2011/0013074 A1* | 1/2011 | Ichimura | G06K 9/0004 348/360 |
| 2012/0169669 A1* | 7/2012 | Lee | G06F 3/0421 345/175 |
| 2015/0187980 A1* | 7/2015 | Yamamoto | G06F 1/00 250/552 |
| 2016/0092717 A1* | 3/2016 | Ling | G06K 9/0004 382/125 |
| 2017/0161543 A1 | 6/2017 | Smith et al. | |
| 2017/0161544 A1 | 6/2017 | Fomani et al. | |
| 2017/0220840 A1* | 8/2017 | Wickboldt | G06K 9/0004 |
| 2017/0220844 A1* | 8/2017 | Jones | G06F 3/0421 |
| 2017/0270342 A1* | 9/2017 | He | G06F 21/32 |
| 2017/0286743 A1* | 10/2017 | Lee | G02B 5/201 |
| 2017/0357840 A1* | 12/2017 | Chen | G02B 3/0056 |
| 2018/0005005 A1 | 1/2018 | He et al. | |
| 2018/0012069 A1 | 1/2018 | Chung et al. | |
| 2018/0260605 A1 | 9/2018 | Wu et al. | |
| 2018/0276444 A1 | 9/2018 | Sun et al. | |
| 2019/0171861 A1* | 6/2019 | Zhang | G06K 9/00026 |
| 2019/0214420 A1 | 7/2019 | Kim et al. | |
| 2019/0228204 A1* | 7/2019 | Park | G09G 3/22 |
| 2019/0286869 A1* | 9/2019 | Ling | H01L 27/3234 |

FOREIGN PATENT DOCUMENTS

| | | |
|---|---|---|
| CN | 208848221 U | 5/2019 |
| EP | 3467705 A1 | 4/2019 |
| WO | 2005060362 A2 | 7/2005 |
| WO | 2014143234 A1 | 9/2014 |
| WO | 2014184055 A1 | 11/2014 |
| WO | 2017211152 A1 † | 12/2017 |
| WO | 2019125271 A1 | 6/2019 |

OTHER PUBLICATIONS

Search Report and Written Opinion dated Aug. 28, 2019 in PCT/EP2019/061738, "Compact Optical Sensor for Fingerprint Detection," (10 pages).
K. Hamanaka, et al., "An Artificial Compound Eye Using a Microlens Array and Its Application to Scale-Invariant Processing," vol. 3, Optical Review, 1996.
J. Duparré, "Microoptical artificial compound eyes," Ph.D. thesis, Friedrich-Schiller-Universität Jena (2005).
A. Brückner, "Microoptical multi aperture imaging system," Ph.D. thesis 2011.

\* cited by examiner
† cited by third party

Microlens

Aperture

Pixel

COMPACT OPTICAL SENSOR FOR FINGERPRINT DETECTION

RELATED APPLICATION(S)

This application is a continuation of International Application No. PCT/EP2019/061738, which designated the United States and was filed on May 7, 2019, published in English, which claims priority to European Patent Application no. 18170996.5, filed May 7, 2018, and European Patent Application no. 18184693.2, filed Jul. 20, 2018. The entire teachings of the above application(s) are incorporated herein by reference.

The present disclosure relates to an optical sensor for use in an image recognition device, e.g. a biometric recognition system, such as a fingerprint detector. The presently disclosed optical sensor has improved light transmittance in a compact and cost-efficient structure. In particular the presently disclosed optical sensor can be placed under a display panel of an electronic device, such as a smartphone.

BACKGROUND OF INVENTION

Fingerprint sensors have been massively integrated in electronic devices with displays, such as smartphones, tablets, laptops, for privacy and data protection, as well as identity authentication. Today the most common fingerprint sensor is a capacitive sensor that works independent from the display of the device. The present move towards displays covering almost the entire front of the device makes it difficult to integrate the fingerprint sensor with the front surface because the capacitive sensors are not easily integrated with the electronics displays Optical fingerprint sensors can be placed beneath the cover glass of the displays, because reflections from a finger can be scattered back through the cover glass and display to the fingerprint sensor. But in order to avoid a blurred image of the fingerprint, an optical fingerprint sensor typically needs to filter out large angle backscattered reflections from the finger before the light rays impinge the pixels of the sensor array.

Current filtering technologies provide light absorbing channels located between the display and the sensor arrays thereby functioning as collimators, see for example US 2017/270342 and US 2018/012069. In order to substantially filter out undesired background light, the thickness of the channels must be about 300 microns with a diameter of every channel of about 30 microns with about 50 microns ditch.

SUMMARY OF INVENTION

A problem with these absorbing channels is that a substantial part of the desired light is absorbed. And the current technology used for manufacturing the absorbing channels is expensive and does not provide high yield. One purpose of the present invention is therefore to provide an optical sensor solution for fingerprint detection that is cost-efficient and which can be integrated with a transparent display in an electronic device.

The present disclosure solves these problems by employing a microlens structure, comprising an array of microlenses, for focusing the desired light onto the pixels of a sensor array whereas undesired light is scattered or absorbed. The present disclosure therefore relates to an optical sensor, aka optical sensor system, for placement under a (transparent) display panel for detecting light returned from an object, such as a fingerprint, on top of the display panel. In a first embodiment the optical sensor comprises a microlens structure having a front side with an array of light focusing/image forming elements and an at least partially transparent back side. The back side may be provided with an array of optically transparent/light transmissive apertures, e.g. in the form of windows, aligned with the focusing elements. I.e. the focal point of each microlens is preferably located in the corresponding aperture. In the preferred embodiment it is only the apertures that are transparent whereas the remaining area of the back side is not light transmissive, e.g. opaque, i.e. light blocking, e.g. in the form of a light blocking layer, such that light cannot be transmitted through the opaque part of the back side. Blocking light transmission can be provided by different means known in the art, such as an absorbing/light blocking colouring/reflective material or a certain roughness of the surface.

A sensor array of optical detectors may be provided, the sensor array facing the back side of the microlens structure. I.e. as the focal point of each microlens is preferably located in the corresponding aperture, the optical sensor system is preferably configured such that light returned from the object can be focused by the microlens structure onto the sensor array through the transparent apertures.

The optical sensor is preferably configured such that fingerprint light with an incident angle of less than or equal to a predefined value is focused to the sensor array whereas fingerprint light with an incident angle of more said predefined value is not detected. The predefined value of the incident angle may for example be 20 degrees, or 15 degrees, preferably 10 degrees, more preferably 8 degrees, even more preferably 6 degrees, most preferably 5 degrees. Or even 4 degrees or 3 degrees in selected embodiments. The presently disclosed optical sensor may be configured to work with the display panel as the light source and/or with one more separate light sources.

The present disclosure further relates to an image recognition device, such as a fingerprint detector, comprising the presently disclosed optical sensor. The fingerprint sensor may comprise a processing unit for processing the signal from the sensor array in order to recognize an image, e.g. detect a fingerprint. The fingerprint sensor may further comprise a storage unit for storing fingerprint information, preferably in encrypted format. The processing unit, the storage unit and the sensor array may be part of one integrated circuit/component.

A further embodiment relates to an electronic device, such as smartphone, tablet, laptop, etc., for optically detecting a fingerprint, comprising a display panel comprising a top transparent layer formed over the display panel as an interface for being touched by a user, and optical sensor which is disclosed herein. The display panel may comprise light emitting display pixels, wherein each pixel is configured to emit light for forming a portion of a display image; and wherein the top transparent layer is configured for transmitting the light from the display panel to display images.

The present disclosure further relates to a method for detecting light returned from a fingerprint on top of a transparent display panel, comprising the steps of focusing and imaging fingerprint light to a sensor array of optical detectors by means of microlenses arranged in a microlens structure located below the display panel, wherein the fingerprint light, i.e. light returned from an object, is received within a predefined incident angle as described above.

The present disclosure further relates to a method for fabrication of a microlens structure having aligned apertures that is suitable for use in the presently disclosed optical sensor system. The fabrication method is in a preferred embodiment directed to the use of a photosensitive material that is applied to the backside of the microlens structure. The photosensitive material may be any material which changes its properties upon receiving light, and by applying light, e.g. collimated light, through the front side of the microlens structure, the optical properties of the microlens structure can ensure that the precisely aligned transparent apertures are created in the photosensitive material on the backside of the microlens structure, thereby resulting in a precise but cost-efficient manufacturing of the microlens structure with transparent apertures in the backside.

DESCRIPTION OF DRAWINGS

The accompanying drawings are included to provide a further understanding of the present disclosure and are incorporated in and constitute a part of this specification.

DETAILED DESCRIPTION OF THE INVENTION

Figure 1A:
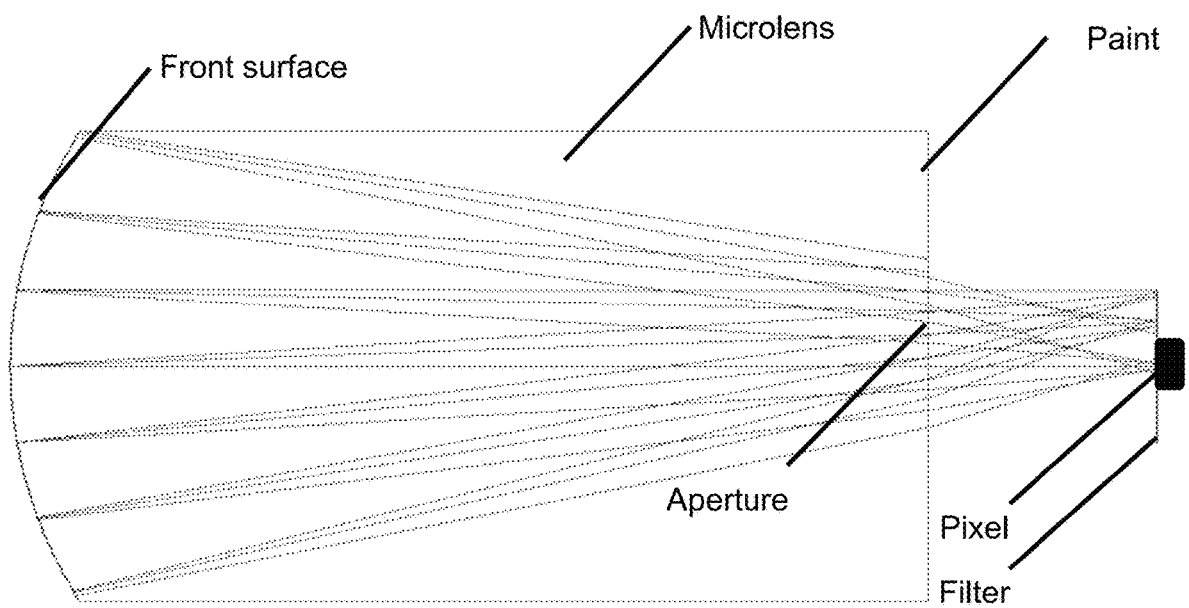
FIG. 1A shows a cut-through side view of an exemplary single microlens of a microlens structure as presently disclosed and a corresponding pixel. The focusing element at the front side of the microlens focuses light on to the pixel by means of a convex front surface.

A major advantage of the present invention is that the microlens structure can focus the desired light such that the desired light within the predefined incident angle can be imaged to pixels on a sensor array. Compared to prior art solutions this means that more of the desired light is detected, i.e. the present microlens structure has a higher transmittance of the desired light. With more light to the detector a fingerprint can be detected faster and/or more precisely.

With the present microlens structure it is also possible to focus the light such that only part of the pixels, for example in a standard CCD or CMOS array, is used for detection, possibly only one third of the pixels. This makes it possible to use a sensor array with much fewer pixels which will be much faster to read, i.e. the fingerprint sensor can detect a fingerprint faster. The pixel could be a pixel of a CCD (Charge Coupled device), CMOS (Complementary Metal Oxide Semiconductor) or a photodiode.

Another advantage is that the presently disclosed structure can be made very compact. The prior art solutions need a certain height of the absorbing channels in order to function properly. The absorbing channels typically have a height of 300-500 µm, whereas the present microlens structure can be made with a height of only 50-100 µm. This fits much better with the current trend of making electronic display devices thinner and thinner.

Each focusing element of the microlens structure can be customized to a certain optical design and configuration. The focusing elements can be spherical, aspherical, pyramid-shaped, convex, concave, etc. The design depends on the medium surrounding the microlens. For example, if the interface is air the focusing element would typically be spherical. If the interface is glue, the focusing elements would typically be aspherical. The back side can be plane but could also be designed to help with focusing of the light, back focal length adjustment, aberration correction, etc. E.g. spherical, aspherical, pyramid-shaped, convex, concave, etc.

In order to reduce cost the present microlens structure can be manufactured such that all focusing elements are identical.

As stated previously the microlens structure may comprise a back side where through fingerprint light can be transmitted. In a preferred embodiment it is not the entire back side of the microlens array that is transparent but only transparent apertures, such as an array of transparent apertures, that correspond to the array of focusing element. The remaining part of the back side can be made opaque. The transparent apertures are exemplified in FIG. 6. The microlens structure is preferably configured such that each of said focusing elements is in optical correspondence with one of said transparent apertures. These transparent apertures help to ensure that only light within the predefined incident angle is transmitted to the sensor array. Undesired light can for example be scattered or absorbed such that it does not hit the detector/sensor array. The microlens structure may for example be configured to absorb or scatter at least part of the fingerprint light having an incident angle of more than said predefined value. E.g. the microlens structure can be configured to be light absorbing except for the front side with the focusing elements and the transparent apertures which are light transmissive. This can for example be provided by applying a dark colour to the surface part of the microlens structure which should be light absorbent. Opacity can also be provided by roughening the back side surface. Another solution is to make the back side surface at least partly reflective, e.g. by covering at least a part of the back side surface with an at least partly reflective material.

In the preferred embodiment of the presently disclosed optical sensor is configured such that fingerprint light is focused and imaged to the sensor array. I.e. each microlens may be configured to focus and/or image fingerprint light to a corresponding pixel on the sensor array. Hence, the microlens structure may be configured such that each focusing element is capable of converging fingerprint light through a corresponding transparent aperture of the back side of the microlens structure. Focusing may for example be provided by providing at least a part of or all of the focusing elements with a spherical surface.

In the preferred embodiment there is no interface between the individual microlens elements in the microlens structure, the bulk inside the microlens is preferably a solid uniform block of a transparent material. The optical properties of the presently disclosed optical sensor could be improved if the side surfaces, i.e. the surfaces connecting the front and back sides, of each individual microlens element were opaque such that undesired light could be absorbed by the side surfaces. However, that would make the microlens structure much more complicated and expensive to manufacture. Instead the optical properties can be controlled by the apertures which can be cost-efficiently designed and manufactured.

A stated previously the sensor array may be a standard CCD sensor array. However, as typically only between ¼ and ½, possibly even between ¹/₁₀ and ½, of the pixels in a standard sensor are actually used in this setup, the sensor array used herein may be configured to comprise only one pixel for each microlens. Fewer pixels make read-out of the sensor array much faster, such that a fingerprint detector can be more efficient.

The presently disclosed optical sensor is typically optically designed to match a predefined display panel where the distance from the touch surface to the microlens structure provides an optical constraint for the design of the microlens structure and the sensor array. With a standard off-the-shelf sensor array the pixel size is predefined which provides another optical constraint. With a customized sensor array the pixel size can be part of the optical design space.

In a further embodiment the presently disclosed optical sensor comprises at least one optical filter. Such an optical filter may be a colour filter that can be configured to filter out light of a predefined wavelength range, such as undesired background light. A filter may also be configured such that only the wavelength range of the light source is allowed to pass. E.g. if an IR light source is use, the colour filter can be configured to transmit only IR light. An OLED display panel typically employs light with three different wavelength ranges. The colour filter can then be configured to transmit only one or two of these wavelength ranges. A filter may for example be provided between the backside of the microlens structure and the sensor array, e.g. just in front of the sensor array as exemplified in FIGS. 1A-C and FIGS. 12-19.

The presently disclosed optical sensor may be configured to utilize light from a light emitting display panel, e.g. a display panel of an electronic device, e.g. by using the OLED light sources that typically are part of a display panel. However, an OLED typically illuminates light both upwards towards the display surface and downwards—towards the fingerprint sensor. Hence, this is not a preferred solution since it would be necessary to distinguish this downwards OLED light from the reflected light from the fingerprint. The preferred solution is therefore to provide at least one (separate) light source for transmitting light such that light is transmitted out from the touch surface where the fingerprints will be located. The light source(s) may advantageously be configured for emitting infrared light, such as around 700-900 nm or 800-900 nm, alternatively or additionally green light. However, other wavelength ranges are possible. The light source may at least one laser or LED which can be provided very cost efficiently and very compact. There are many solutions to integrate one or more light sources such that light is transmitted out from the touch surface. The drawings illustrate various examples. A preferred solution is four light sources distributed around the sensor array as exemplified in FIG. 25. The light source(s) may also be integrated in the sensor array. The light source(s) may even be integrated in each pixel of the sensor array which is in optical correspondence with an aperture of the microlens structure. This is one way of ensuring coaxial illumination. The light source(s) may also be integrated such that a cover glass on the display panel is used as a waveguide for distributing the light as exemplified in FIGS. 22-23.

In the preferred embodiment the microlens structure is manufactured in a polymeric material, such as PMMA or PC, preferably by injection moulding or film pressing. The microlens structures can be manufactured in large units, each unit comprising a plurality of microlens structures. The individual microlens structures for use in an optical sensor can then be provided by cutting the large units into smaller structures.

The transparent apertures can be provided by painting the back side of the microlens structure in an absorbing colour, preferably a dark colour such as black, except for the apertures thereby forming the transparent apertures. Painting can be provided by means of printing on the microlens structure, e.g. with the combination of a mask. The transparent apertures can be any geometric form, but a circular structure is the preferred for optical imaging reasons. The transparent apertures may advantageously have an area of less than 800 µm$^2$, more preferably less than 400 µm$^2$, more preferably less than 200 µm$^2$, most preferably less than or around 100 µm$^2$. I.e. the apertures may be cylindrical.

The transparent apertures can also be provided by making at least a part of the back side of the microlens structure at least partly reflective, such as fully reflective or partly reflective partly absorptive. This can be provided by attaching a reflective material to the back side of the microlens structure as exemplified in FIG. 15B, where reflective material has been attached to the back side of the microlens structure, i.e. below the microlens structure, to create the transparent apertures between the reflective material elements. The advantage of this solution is that light incident on the reflective back side can be reflected back towards the display panel and thereby be used for illuminating an object such as a fingerprint on the display panel. I.e. less photons are wasted due to absorption in the microlens structure but can be reused for illumination thereby increasing the utilization of the light source and improving the efficiency of the device.

In one embodiment of the present disclosure a reflective back side of the microlens structure is provided by means of a metal, such as a metal foil, such as an aluminium foil, which can be attached to the back side of the microlens structure. The transparent apertures can be provided by cutting and/or stamping holes in the metal foil such that correspondence is provided with the individual microlenses of the microlens structure.

In one embodiment of the presently disclosed optical sensor, the distance between the front side and the back side of the microlens structure is less than 400 µm, more preferably less than 300 µm, even more preferably less than 200 µm, yet more preferably less than 100 µm, even more preferably less than 75 µm, yet more preferably less than 60 µm, most preferably less than 55 µm. The focusing elements, i.e. the microlenses, of the microlens structure may have a diameter of less than 100 µm, more preferably less than 50 µm, even more preferably less than 30 µm, most preferably less than or around 25 µm. The individual focusing elements may be configured to have a back focal length of less than 30 µm, more preferably less than 20 µm, more preferably less than 15 µm, most preferably less than or approx. 10 µm. Hence, the footprint of the microlens structure in the plane of the sensor array may therefore be less than 400 mm$^2$, more preferably less than 200 mm$^2$, most preferably less than or around 100 mm$^2$.

In one embodiment of the presently disclosed optical sensor, the sensor array is glued to the microlens structure. In order to further improve the optical properties of the presently disclosed optical sensor the sensor array may be spaced from the back side of the microlens structure, as also exemplified in many of the drawings. This spacing may be provided by means of glue. This attachment between microlens structure and sensor array may be provided such that the interface between microlens structure and sensor array is air or it may be a transparent glue. For example the sensor array is mounted with a predefined distance to the back side of the microlens structure, for example a predefined distance of between 5 and 30 µm, preferably between 10 and 15 µm. This distance typically corresponds to the back focal length of the focusing elements. This spacing ensures that part of undesired light which is transmitted through the transparent aperture, e.g. incoming light with an incident angle which is slightly higher than the predefined angle, does not hit the corresponding pixel.

The total height of the presently disclosed optical sensor may consequently be less than 500 µm, more preferably less than 300 µm, more preferably less than 200 µm, even more preferably less than 150 µm, most preferably less than 100 µm.

The optical sensor may substantially square or rectangular. However, a substantially elongated embodiment is also an option such that the sensor becomes a line scanner.

One embodiment relates to an optical sensor (system) for acquiring images comprising a microlens structure having a front side with an array of light focusing elements and a light blocking layer with an array of optically transparent apertures aligned with the focusing elements, and a sensor array of optical detectors disposed under the light blocking layer, wherein the microlens structure is configured to converge an optical signal from above the microlens structure to the apertures, the optical signal being transmitted to the sensor array via the apertures. The focus points of said microlens structure are preferably located within said apertures. The apertures may advantageously be cylindrical. Sizewise the number of microlenses in the microlens structure is preferably not less than 121.

Thickness of Aperture Array

In an additional embodiment of the present disclosure the apertures have a significant thickness along an axis perpendicular to the major plane of the apertures, such as at least 3 µm, more preferably at least 6 µm, even more preferably at least 9 µm, yet even more preferably at least 12 µm, most preferably at least 15 µm, in order to form elongated, e.g. cylindrical, apertures. The thickness of the elongated apertures of the microlens structure may have a significant impact on the ability of the apertures to filter out undesired light with large incident angles. The non light transmissive parts of the backside of the microlens structure, acting to form the apertures, may have a similar thickness as the light transmissive/optically transparent apertures. Alternatively, the opaque, non light transmissive, parts may be applied in a substantially three-dimensional configuration for formation of elongated apertures having a substantial thickness along an axis perpendicular to the sensor array, such as at least 3 µm, more preferably at least 6 µm, even more preferably at least 9 µm, yet even more preferably at least 12 µm, most preferably at least 15 µm. A larger thickness of the elongated apertures may decrease the incident angle at which light can pass the aperture without being blocked/absorbed by the non light transmissive parts, e.g. opaque paint. Having a significant thickness of the elongated apertures, such as at least 3 µm, more preferably at least 6 µm, even more preferably at least 9 µm, yet even more preferably at least 12 µm, most preferably at least 15 µm, may lead to the negating of the need for a space between the apertures and the sensor array. Such that fingerprint light with a large incident angle may be blocked or absorbed by the aperture. Elongated apertures are exemplified in FIGS. 28 and 29.

Spacing Between Microlenses, Apertures and Sensor Array

In an additional embodiment of the present disclosure means for electrically insulating the sensor array from the aperture array are provided. Insulating means may comprise the use of a layer between the sensor array and the aperture array, wherein the layer may consist of a gap, such as an air gap, or by a material which is substantially an insulator. By the incorporation of an insulating layer, the aperture array of the microlens structure may be fabricated in a conductive material facing the sensor array containing the photoelectric pixels, without risking that the arrangement leads to a distorted output signal of the sensor array, such as comprising an increase in noise, or even short-circuit of the assembly. Preferably, the apertures comprise one optical filter, or multiple optical filters, such as one for each microlens, that is configured to filter out light of a predefined wavelength range, such as undesired background light. The filter may also be configured such that only the wavelength range of the light source is allowed to pass. The filter may be provided in the same layer as the apertures of the microlens structure. The filter layer may further comprise a single filter for each microlens, such that each filter is surrounded by the non light transmissive paint. In this way, the light filter may constitute, or form part of, the aperture. For example, each aperture of the microlens structure may comprise a filter.

In an additional embodiment, the aperture array may be in contact with the sensor array, but may in another embodiment be positioned adjacent, with a gap, to the sensor array. The absence of space between parts of the sensor arrangement may aid in the mass production of the device.

In an additional embodiment of the present disclose, the apertures are in contact with the microlens layer. Alternatively, the apertures may not be in contact with the microlens layer, such that there is a gap between the microlens array and the apertures.

Fabrication of Apertures Aligned with the Microlenses

In an additional embodiment of the present disclosure, a method for fabrication of a microlens structure having aligned apertures is provided. Preferably, the fabrication method relies on the use of a photosensitive material which is applied to the back side of the microlens structure. The photosensitive material may be any material which changes its properties upon receiving light, such that the end result following fabrication of the microlens structure is that areas of the photosensitive material which have received light and areas which have not received light have a different transmissivity of the incident light. As such, the photosensitive material may be a photopolymer, for example a positive photopolymer wherein the solubility in a suitable developer is altered by the application of light, such as UV light. The method for fabrication preferably relies on light being received and reflected by the microlens structure, wherein the light received by each microlens or the microlens array is focused to a single point on the photosensitive material on the back side of said microlens structure. The light irradiating the photosensitive material is preferably sufficient in the focal point of the microlenses to induce said material changes, wherein if a photopolymer is used, transparent apertures may be formed which are precisely aligned with the microlenses of the microlens structure. A person skilled in the art recognizes that many combinations of photopolymers, wavelengths and dose requirements are possible in order to achieve a microlens structure having aligned transparent apertures.

Figure 30:
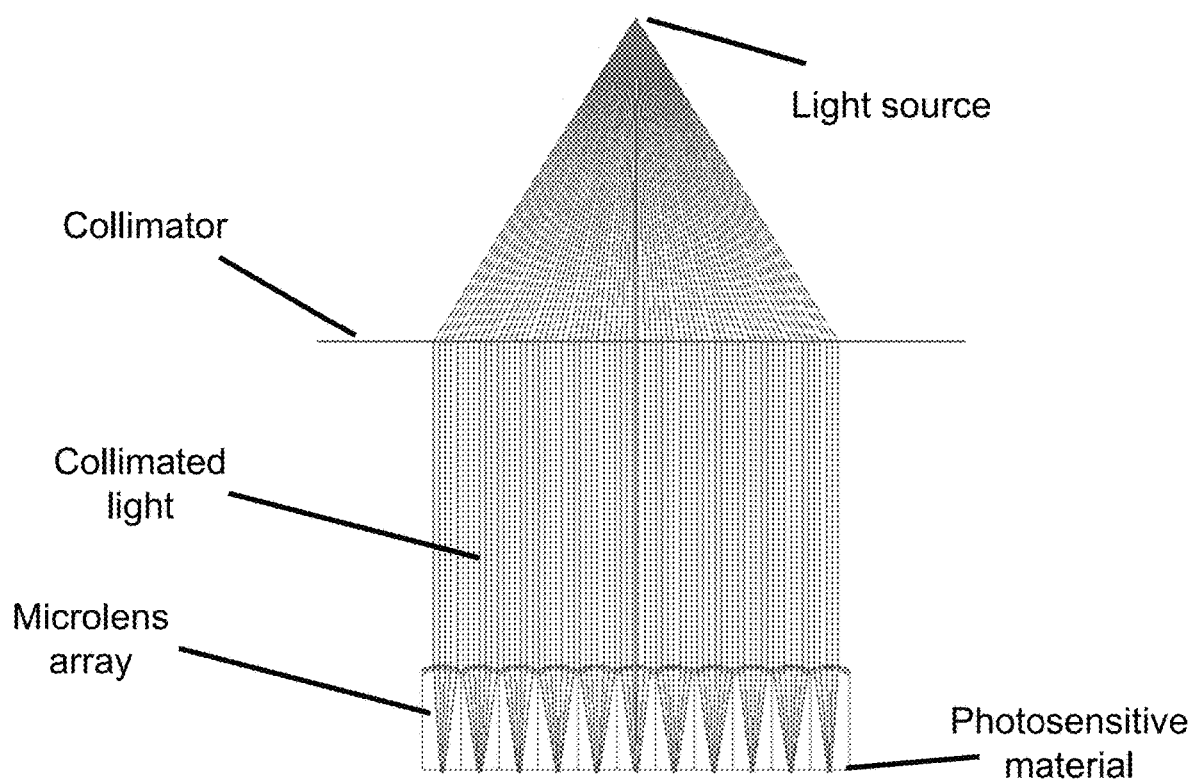
FIG. 30 shows a schematic diagram for fabrication of apertures that are aligned with the microlenses by the use of a photosensitive material.

In a preferred embodiment the photopolymer is non transmissive (e.g. opaque) to the reflected light from an object. In another embodiment the photopolymer may be used as a sacrificial layer following coating the back side of the microlens structure with a secondary material, such as a metal. The light used for fabrication of the apertures may be, but not necessarily, collimated light and/or coherent light, and may further consist of substantially a single wavelength or may consist of a broad spectrum of wavelength. In a preferred embodiment of the fabrication process substantially collimated light is used, leading to incident light passing through the microlenses of the microlens structure being focused into narrower spots. As the thickness of the applied photosensitive material, such as a photopolymer, is reflected after fabrication in the length of the aperture, along an axis substantially perpendicular to the backside of the microlens structure. Preferably, without being limiting, the fabrication process is carried out without the need of a photomask. By having the front of the microlens structure, where the fingerprint light is received, entirely consisting of microlenses, such the surface for example consists entirely of multiple convex structures, the entire microlens structure may be irradiated simultaneously, as all incident light can be focused into a focal point of one of the lenses. In another embodiment the collimated light may have a non-zero incident angle for being able to adjust the size and shape of the final apertures. Furthermore the collimated light may be in the form of a line or a surface. In another embodiment there is a layer of air, polymer, glass or other insulating materials between the microlens array and the light sensitive material. At least one light source is used during the fabrication, multiple light sources may be used, and they may further have the same or different wavelengths. FIG. 30 shows an example of the use of collimated light for generating apertures in the back side of a microlens structure covered with photosensitive material.

In another embodiment the fabrication method relies on the application of a material which is sensitive to laser ablation to the backside of the microlens structure; the material preferably being non-transmissive to the light returned from the object. Laser light may, following application of the material, thereafter be shined on the front side of the microlens structure such that the microlenses of the microlens structure focus the laser light onto the non-transmissive material, acting to form apertures within the material. A person skilled in the art recognizes that many types of lasers sources and photosensitive materials may be combined in order to form apertures by laser ablation.

Lens Properties

As used herein, a lens (e.g. a microlens) include, but are not limited to elements with a cross-sectional structure that is hemispherical, aspherical, conical, triangular, rectangular, polygonal, or a combination thereof along a plane perpendicular to the microlens structure of the lens through the centre of the lens.

The lens may have optical properties such that it is substantially transparent to at least the light returned from the object. Further, the lens may have a refractive index above 1, preferably at least 1.1, more preferable at least 1.2, even more preferable at least 1.25, most preferable at least above 1.25. Preferably collimated incident light is focused by the microlens into a single point located in the focal plane of the microlens.

In an additional embodiment of the present disclosure the lenses are lenticular lenses, such as linear lens arrays and/or two-dimensional lens arrays such as close-packed hexagonal or any other two-dimensional array. The apertures of a microlens structure employing lenticular lenses may be, but are not limited to, the use of slits instead of pinhole apertures. In further embodiments of the present disclosure, the apertures have other shapes such as rectangular, such as a square, oval or polygonal.

EXAMPLES

FIG. 1A shows a cut-through side view of an exemplary single microlens of a microlens structure as presently disclosed and a corresponding pixel. The focusing element at the front side of the microlens focuses light on to the pixel by means of a convex front surface. The convex front surface functions as focusing element when located in a medium with lower refraction index than itself, such as air. Part of the back side is painted to opaque. Unpainted part is the transparent aperture. Desired light pass through the aperture then hit the pixel which is an optical detector. Undesired light is absorbed by the paint, filtered by the filter, or hit outside of the pixel. The front side of the microlens in FIG. 1A is a sphere with radius of curvature of 24 microns, while the back side is a plane. The length of the microlens is 54 microns, width and height are both 24 microns. Back focal length is 13 microns. The transparent aperture in the center of the back side is circular and it formed by painting the rest of the back side opaque or making it rough. The size of the corresponding pixel is 8×8 microns. The center of the front side, back side and the pixel is one-to-one-correspondence. In other words, they are co-axial. The microlens is designed to be exposed to air, i.e. the interface to the front side and the back side of the microlens should be air. A filter in front of the pixel is provided to filter light with undesired wavelengths, e.g. by only allowing light with the signal wavelength pass. A suitable filter can significantly reduce background light.

The size of the area sensitive to fingerprints depends on the practical necessity. In order to provide a 10 mm×10 mm area which is sensitive to fingerprint, then a 417×417 array of microlenses and pixels as illustrated in FIG. 1A would be suitable.

Figure 1B:
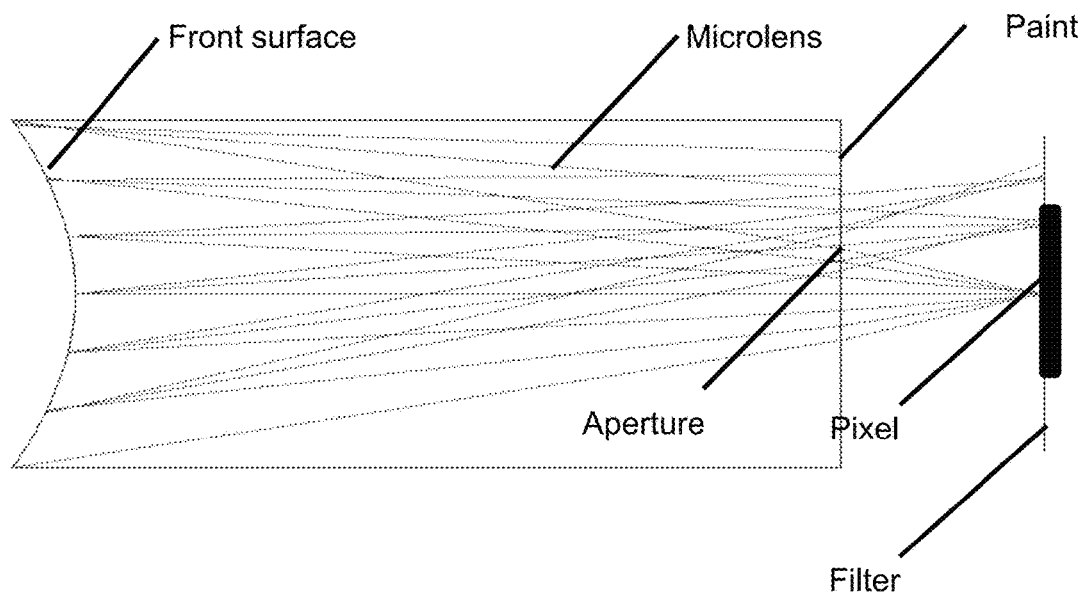
FIG. 1B shows a cut-through side view of an exemplary single microlens with a concave front surface as part of a microlens structure as presently disclosed and a corresponding pixel.

In another example the front side of the microlens is spherical with radius of curvature of 50 microns, while the back side is a plane. The length of the microlens is 100 microns, width and height are both 50 microns. Back focal length is 20 microns. The transparent aperture in the center of the back side, i.e. co-axial, is circular with a diameter of 20 microns. The size of the corresponding pixel is 15×15 microns. The microlens is designed to be exposed to air FIG. 1B shows a cut-through side view of an exemplary single microlens of a microlens structure as presently disclosed and a corresponding pixel. The concave focusing element at the front side of the microlens focuses light on to the pixel. The concave front surface functions as focusing element when located in a medium with higher refraction index than itself.

Figure 1C:
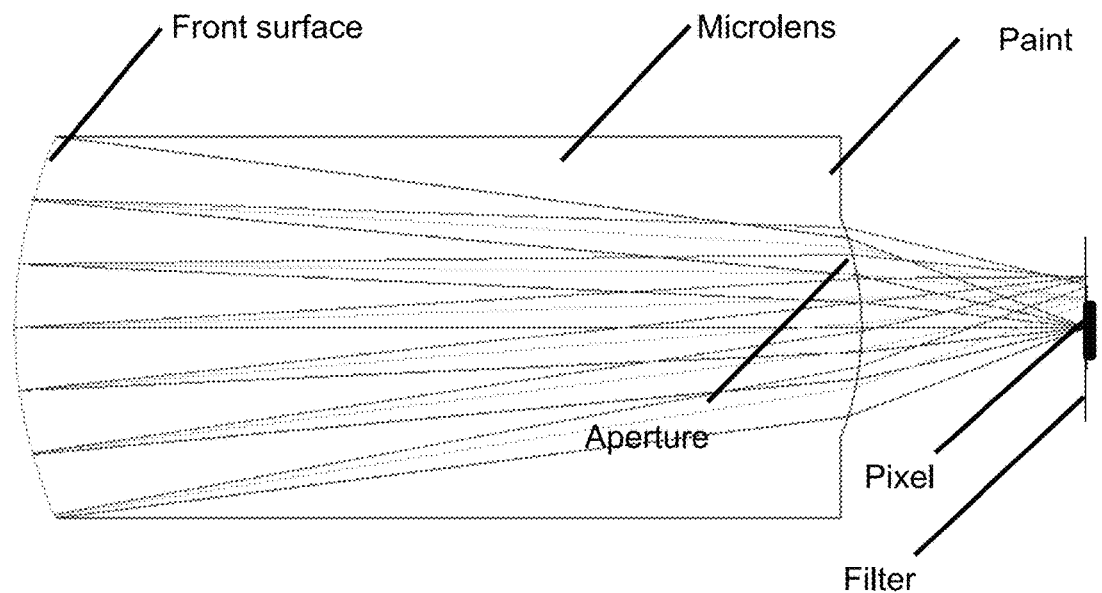
FIG. 1C shows a cut-through side view of an exemplary single microlens with a convex front surface and a curved back side as part of a microlens structure as presently disclosed and a corresponding pixel.

FIG. 1C shows a cut-through side view of an exemplary single microlens of a microlens structure as presently disclosed and a corresponding pixel. The focusing element at the front side of the microlens focuses light on to the pixel. The front side of the microlens is convex and the back side of the microlens is non-flat, it curves to help with focusing of the light. This can provide back focal length adjustment, aberration correction, etc.

Figure 1D:
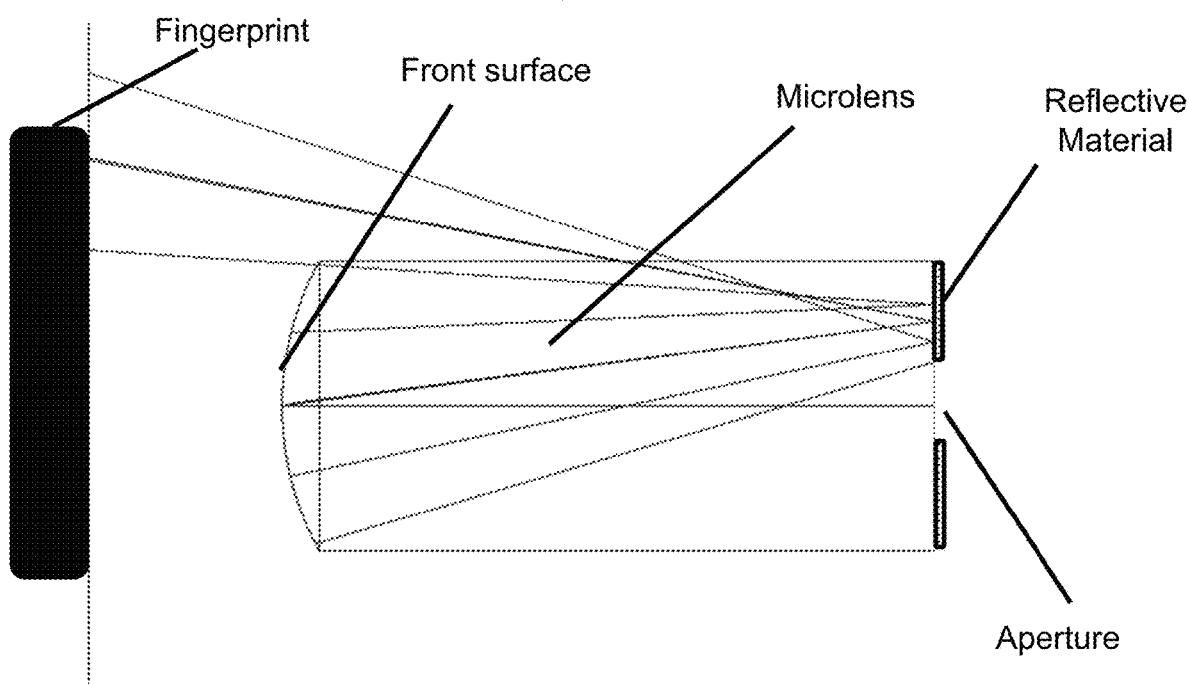
FIG. 1D shows a cut-through side view of an exemplary single microlens with a convex front surface and a reflective back side as part of a microlens structure as presently disclosed and a corresponding fingerprint.

FIG. 1D shows that a kind of reflective material on the back side of the microlens is used to form the transparent aperture. In the illustrated example light with a large incidence angle is incident on the reflective material. Instead of being absorbed the light is reflected back towards the display panel to increase the illumination of the fingerprint. I.e. the fingerprint is illuminated by original light source as well as light reflected by the reflective back side of the microlens.

Figure 2:
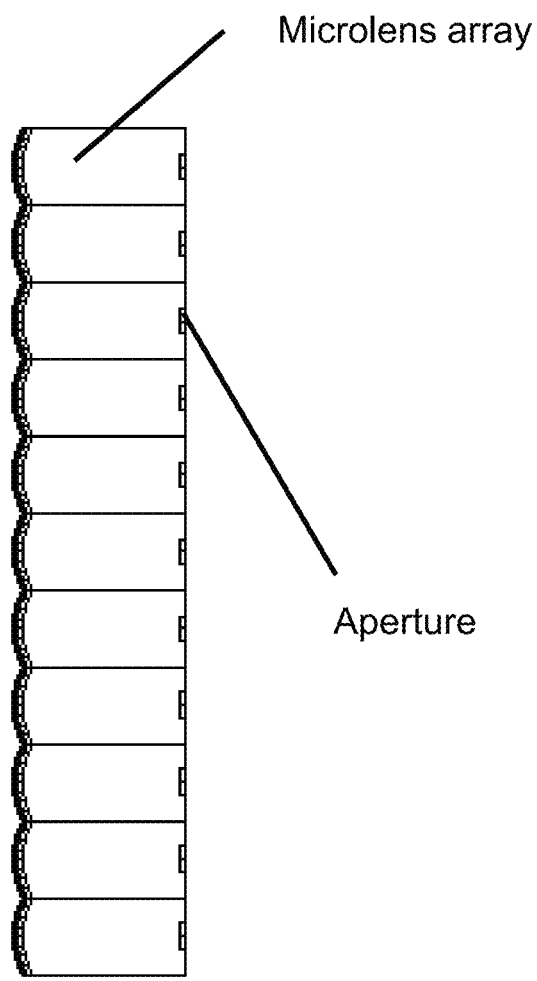
FIG. 2 shows a cut through view of a schematic diagram of a part of a microlens structure including eleven abutting microlenses arranged in an array.

FIG. 2 shows cut through view of a schematic diagram of a part of a microlens structure including eleven abutting microlenses arranged in an array. Even though the individual microlenses are indicated with horizontal there is no interface between the microlenses, because optical isolation between the microlenses is not necessary, this reduces the manufacturing cost. This is in contrast to the prior art optical channel solution where optical isolation between neighboring channels is necessary.

Figure 3:
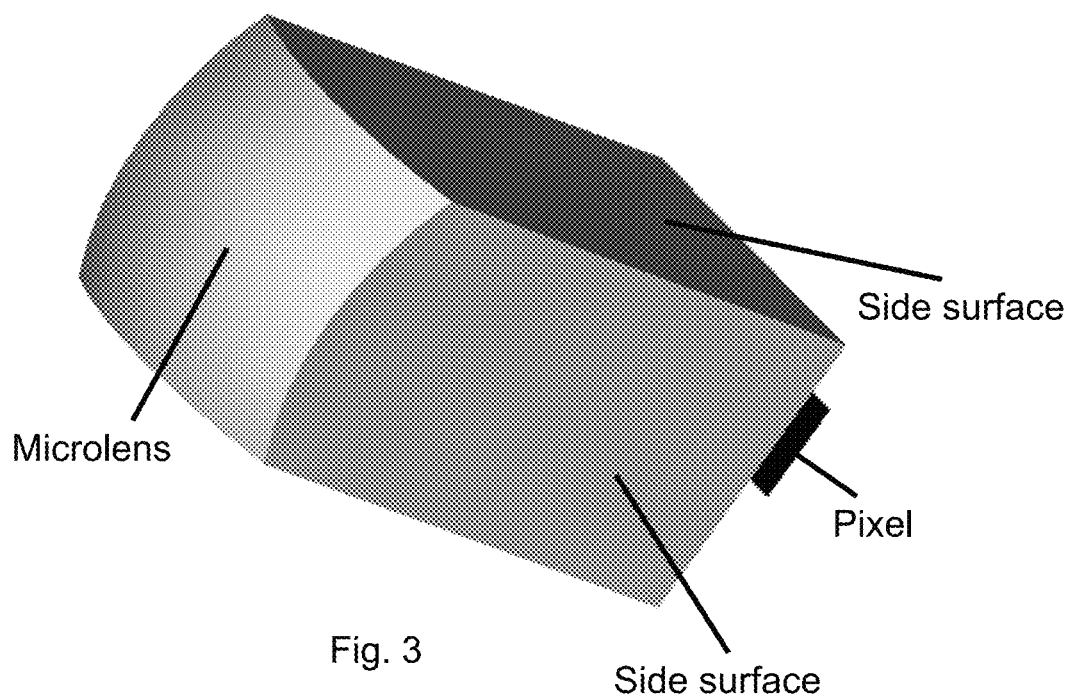
FIG. 3 shows a perspective illustration of the microlens+pixel shown in FIG. 1A.

FIG. 3 shows a perspective illustration of the microlens+pixel shown in FIG. 1A. The transparent side surfaces are indicated.

Figure 4:
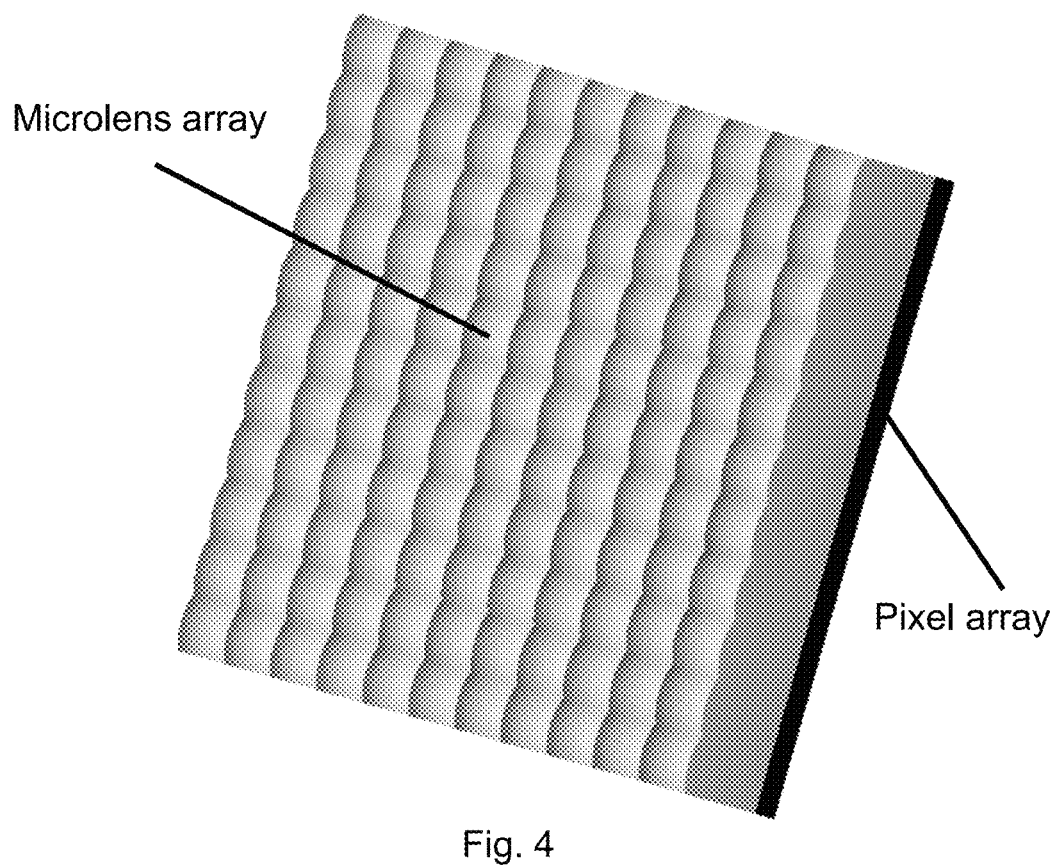
FIG. 4 shows a perspective illustration of a plurality of the microlenses in FIG. 3 arranged in an array forming part of a microlens structure in front of a pixel array.

FIG. 4 shows a perspective illustration of a plurality of the microlenses in FIG. 3 arranged in an array forming part of a microlens structure in front of a pixel array. As a practical implementation typically comprises many thousands of microlenses the illustrated array of 121 microlenses is only a very small part of an actual microlens structure.

Figure 5:
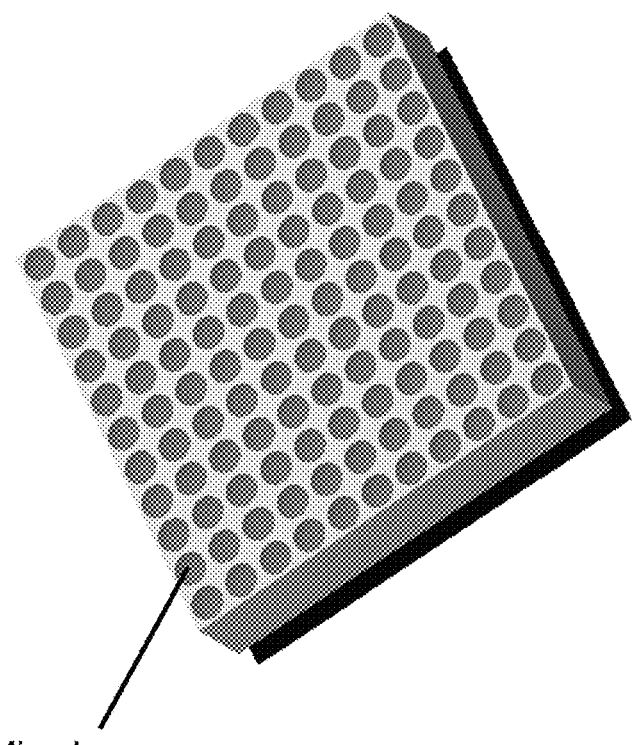
FIG. 5 shows another perspective illustration of the front side of an array of microlenses.

FIG. 5 shows another perspective illustration of the front side of an array of microlenses. The example in FIG. 5 shows circular fronts, but other options are possible, e.g. hexagonal, triangular, etc. As long as an area can be formed.

Figure 6:
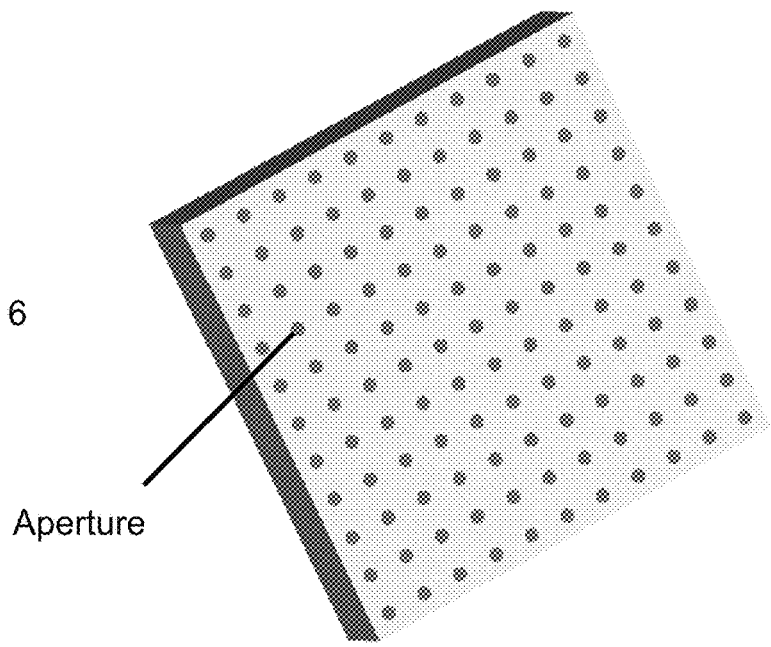
FIG. 6 shows the back side of the microlens array in FIG. 5. The circles illustrate the transparent apertures. The remaining part of the back side is opaque.

FIG. 6 shows the back side of the microlens array in FIG. 5. The circles illustrate the transparent apertures. The remaining part of the back side is opaque or rough such that undesired light is absorbed. The shape of the aperture could also be square, hexagonal, other equilateral polygons, but circular is the most preferred. Without optical isolation between neighboring microlenses, the transparent apertures are important for filtering/absorbing undesired light.

Figure 7:
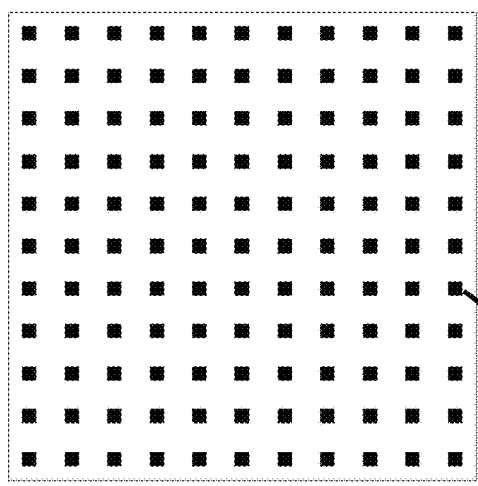
FIG. 7 shows an example of pixel array that correspond to the microlens array in FIGS. 5-6. The black squares illustrate the pixels.

FIG. 7 shows an example of pixel array that correspond to the microlens array in FIGS. 5-6. The black squares illustrate the utilized pixels. Each square represents one effective pixel. The shape of the individual pixel could vary as well, the size of the pixels is part of the optical design. The effective pixel could be one pixel or a plurality of pixels, such as CCD pixels, COMS pixels and photodiodes. Assembling several (neighboring) pixels to one effective pixel in a sensor array can be controlled by software.

Figure 8:
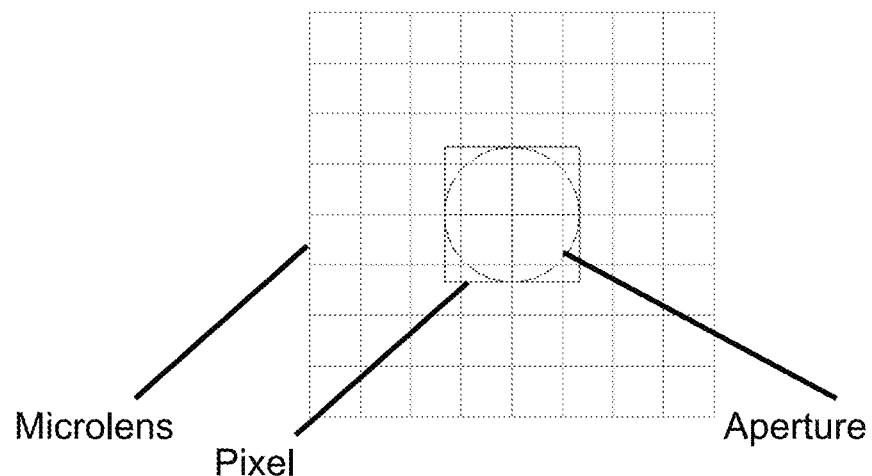
FIG. 8 shows an illustration of the relations between corresponding microlenses, transparent aperture and pixel.

FIG. 8 shows an illustration of the relations between corresponding microlens, transparent aperture and pixel. In this case, a single microlens is square. The aperture is circular and with as substantially smaller area. The pixel is square corresponding in diameter to the aperture. A square microlens arrangement as illustrated makes full use of the front side of the micro lens array. It collects as much light as possible and thereby improves light transmittance compared to prior art optical fingerprint sensors.

Figure 9:
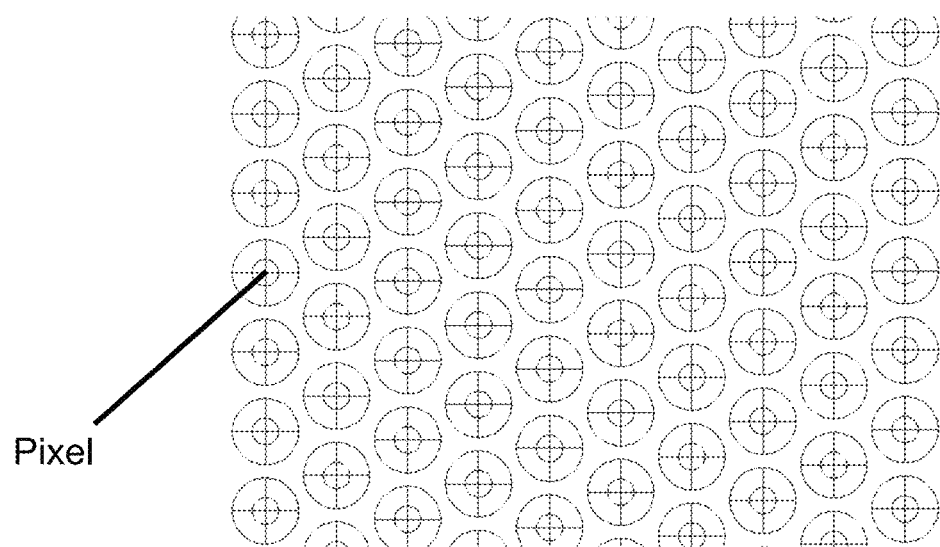
FIG. 9 shows another arrangement of microlenses in a microlens structure where the microlenses are arranged in a hexagonal configuration.

FIG. 9 shows another arrangement of microlenses in a microlens structure where the microlenses are arranged in a hexagonal configuration. Compared to the square arrangement in FIG. 9 this hexagonal arrangement will typically have less light transmittance because the spatial arrangement of the microlenses is less space efficient.

Figure 10:
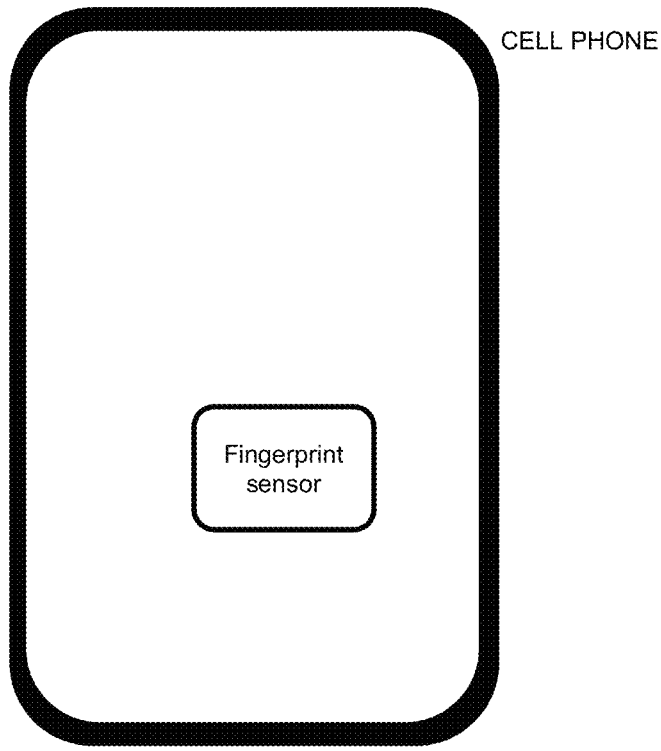
FIG. 10 shows an outline of a cell phone/smartphone with an exemplary position of a fingerprint sensor under the display of the phone.

FIG. 10 shows an outline of a cell phone/smartphone with an exemplary position of a fingerprint sensor under the display of the phone. As long as the cellphone has a transparent display the presently disclosed optical sensor and fingerprint detector can be mounted anywhere under the display.

Figure 11:
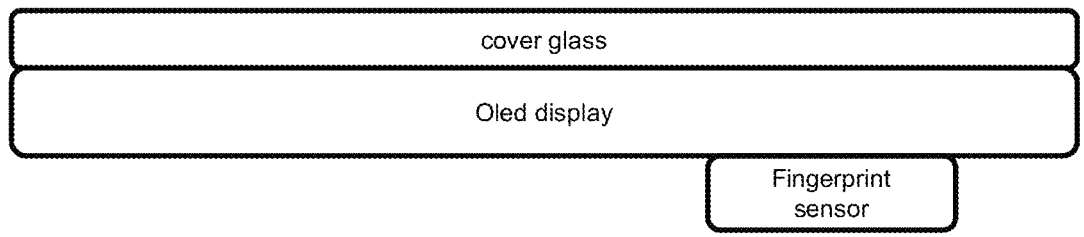
FIG. 11 shows a cut-through side view of the setup in FIG. 10 where the cover glass is for being touched by a cell phone user is located above an OLED display. The fingerprint sensor is located below the OLED display.

FIG. 11 shows a cut-through side view of the setup in FIG. 10 where the cover glass is suitable for being touched by a cell phone user is located above an OLED display. The fingerprint sensor is located below the OLED display. The sizing in FIG. 11 is not shown realistically because the presently disclosed fingerprint detector will typically be much thinner than a display panel+cover glass.

Figure 12:
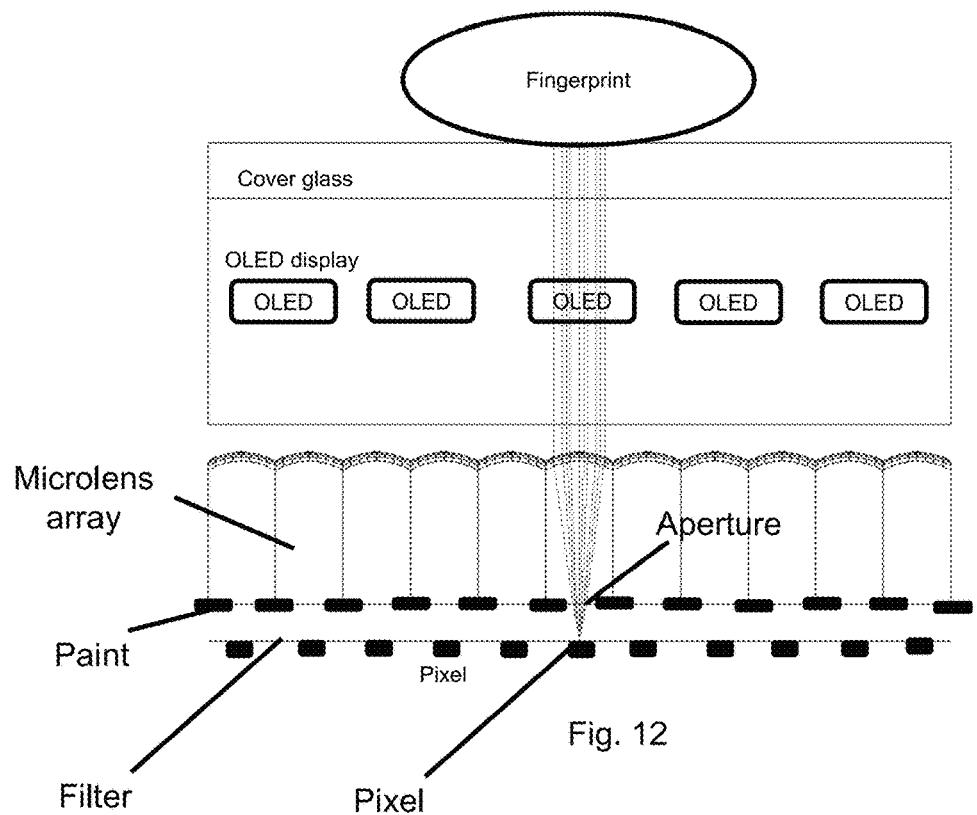
FIG. 12 shows an illustration of the functionality of one embodiment of the presently disclosed optical sensor. Reflected light from fingerprint with 0° incident angle is focused by a microlens to the pixel.

FIG. 12 shows an illustration of the functionality of one embodiment of the presently disclosed optical sensor. Reflected light from a fingerprint with 0° incident angle is focused by a microlens to the corresponding pixel. Before it reaches the microlens array, the reflected light passes though the cover glass and the transparent or translucent display panel. In other means, the presently disclosed optical sensor and image recognition device can be mounted under other transparent or translucent material.

Figure 13:
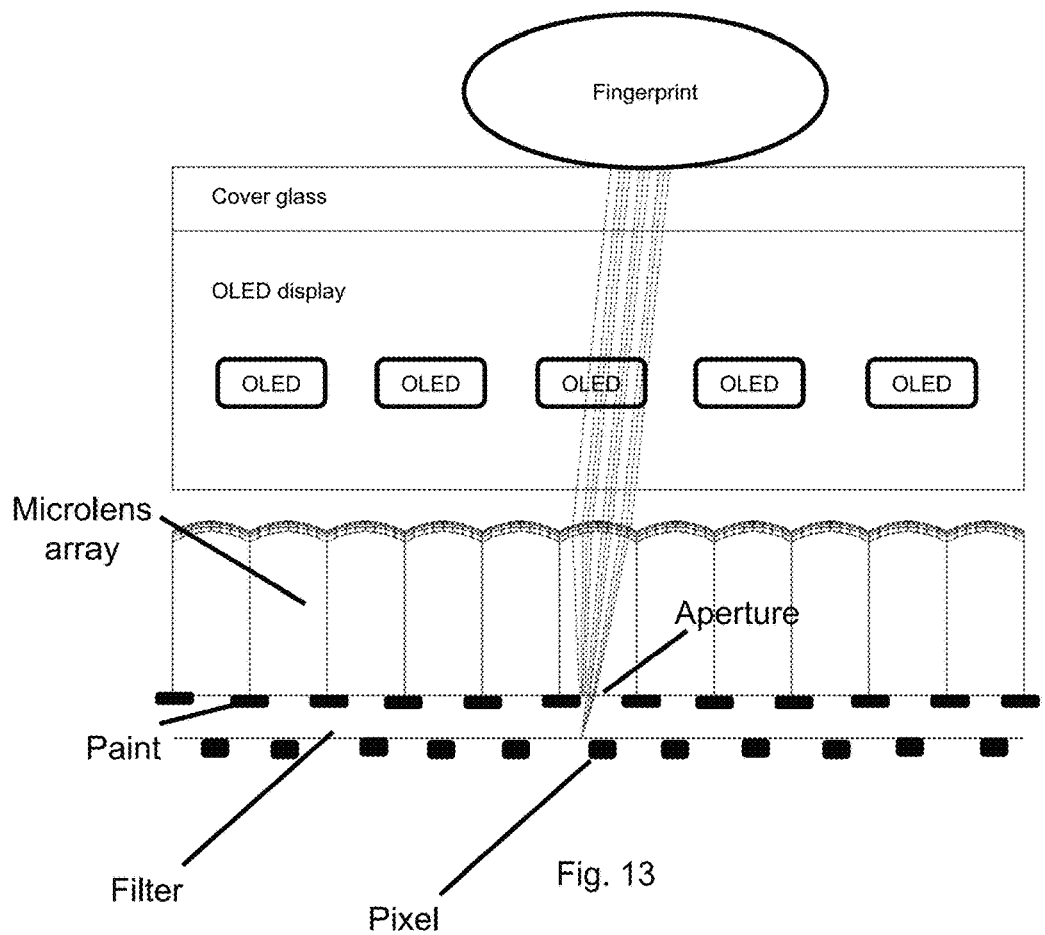
FIG. 13 corresponds to FIG. 12 but the incident angle is now 6°. The result is that the light is focused by the microlens and transmitted through the back side of the microlens structure, but with the larger incident angle the focused light does not hit the pixel due to the spacing between sensor array and back side of the microlens structure. I.e. the undesired light with larger incident angle is not detected.

FIG. 13 corresponds to FIG. 12 but the incident angle of the reflected light is now 6°. The result is that the light is focused by the microlens and transmitted through the back side of the microlens structure, but with the larger incident angle the focused light does not hit the pixel due to the spacing between sensor array and back side of the microlens structure. I.e. the undesired light with larger incident angle is not detected.

Figure 14:
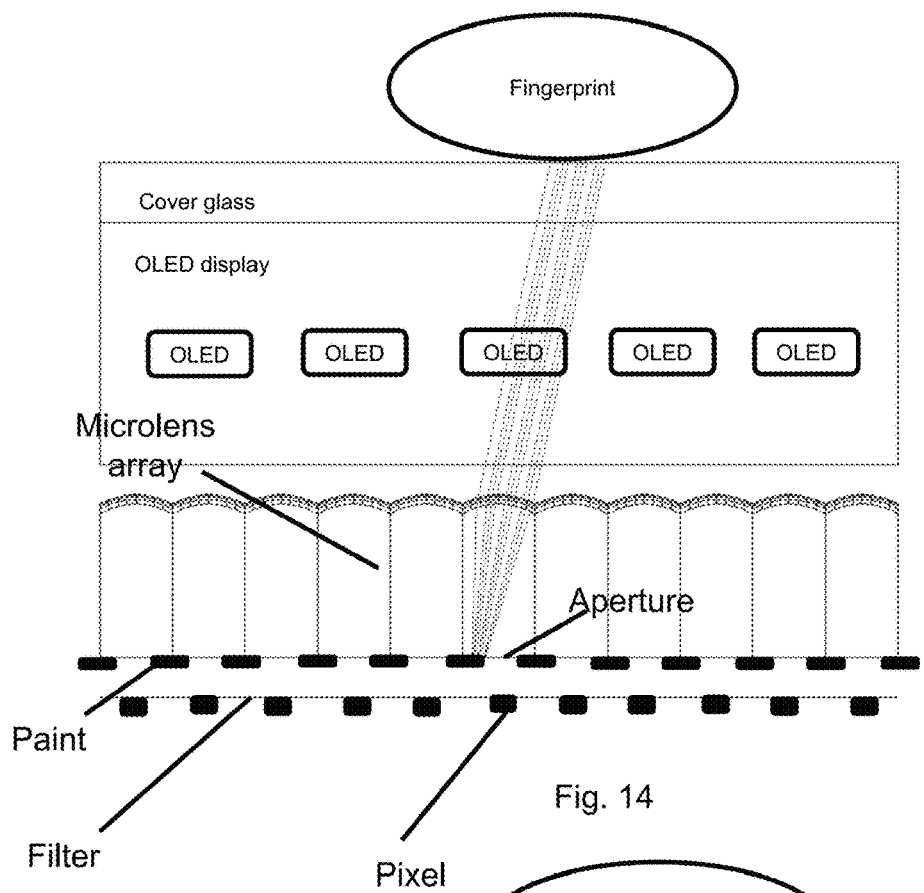
FIG. 14 corresponds to FIG. 12 but the incident angle is now 13°. The result is that the light is focused by the microlens but absorbed by the back side of the microlens structure which is opaque outside of the transparent apertures. I.e. the undesired light with large incident angle is not detected.

FIG. 14 corresponds to FIG. 12 but the incident angle is now 13°. The result is that the light is focused by the microlens but absorbed by the back side of the microlens structure which is opaque outside of the transparent apertures. I.e. the undesired light with large incident angle is not detected.

Figure 15A:
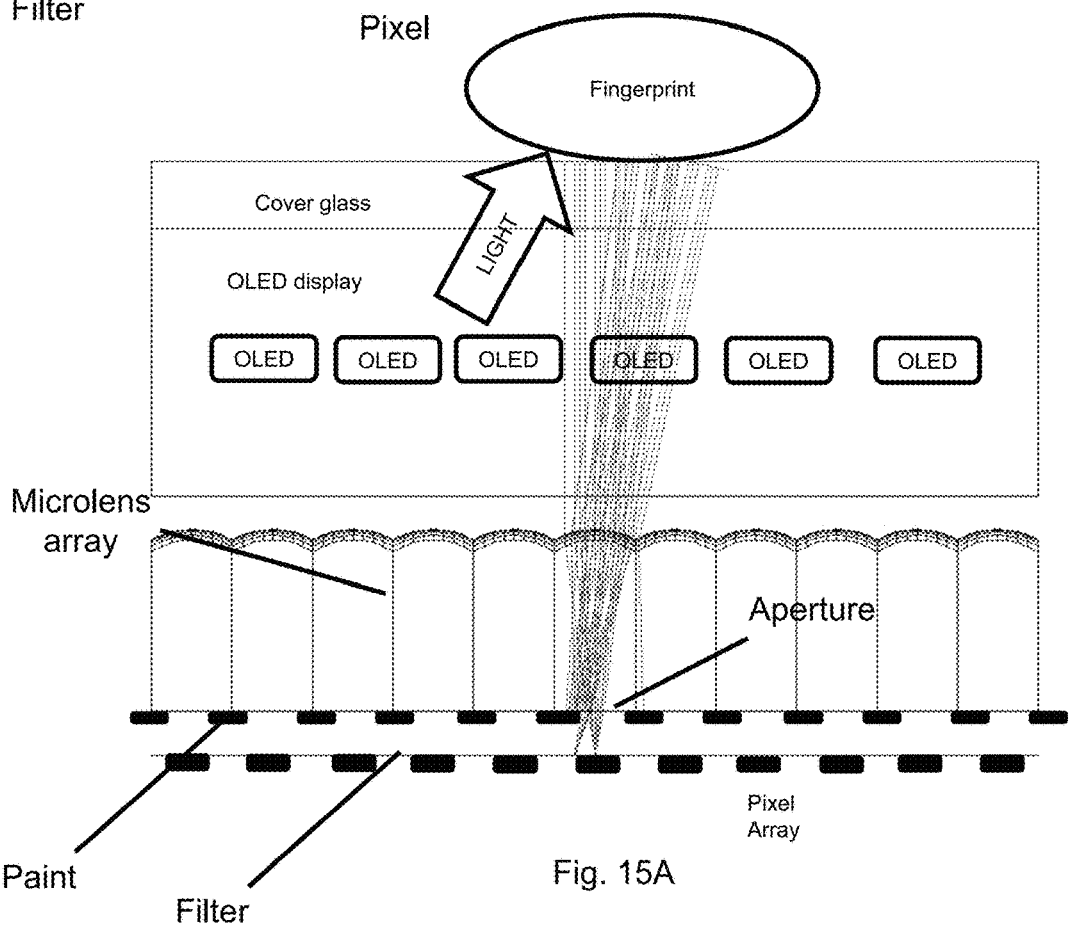
FIG. 15A is combination of FIGS. 12-14. The light source used is the OLED display.

FIG. 15A is combination of FIGS. 12-14 showing light reflected from the fingerprint with incident angles of 0, 6 and 13 degrees, respectively. The light source used is the OLED display. The OLED is a convenient light source for the presently disclosed fingerprint sensor. It emits strong enough light and with suitable control it provides uniform illumination. But the OLED provides much background light as well. And furthermore, an OLED display emits visible light. As a result hereof ambient light becomes background light to the pixels as well. This is one of the reasons why an IR light source is preferred.

Figure 15B:
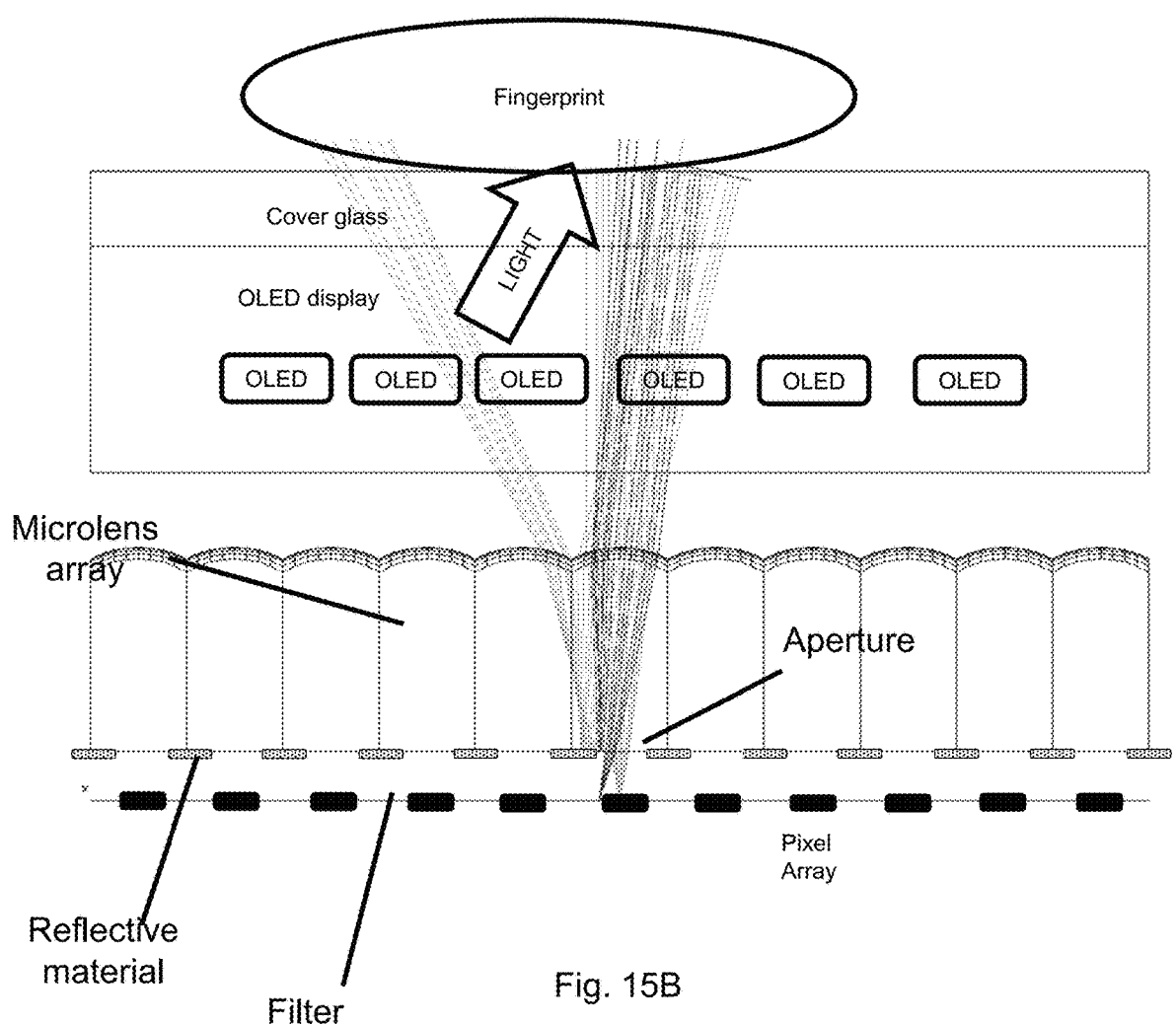
FIG. 15B corresponds to FIG. 15A, but the absorbent paint has been exchanged for reflective material.

FIG. 15B illustrates how elements of reflective material can be utilized to replace the absorbent back side surface of the microlens array showed in FIG. 15A. The result is that light can be reflected back towards the fingerprint to increase illumination of the fingerprint, instead of having the photons absorbed in the back side of the microlens structure.

Figure 16:
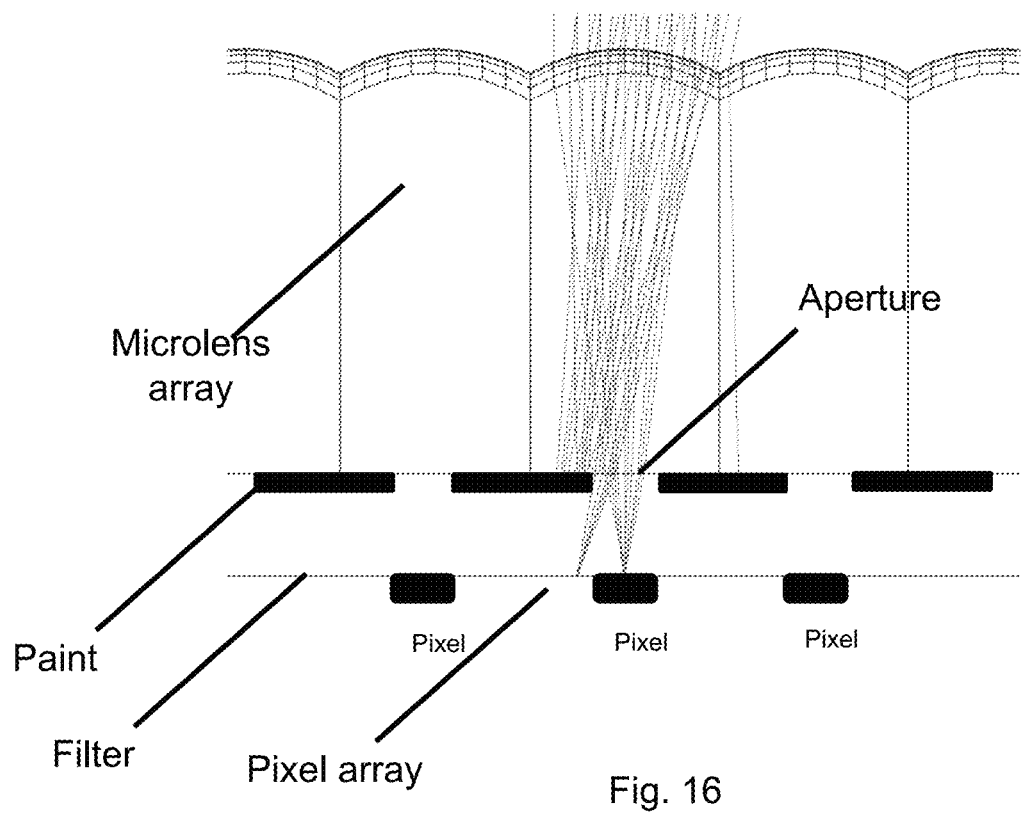
FIG. 16 is a zoomed in view of FIG. 15A

FIG. 16 is a close-up view of FIG. 15A showing the light transmittance through the microlens and aperture. Light with 0 degree incident angle is focused to the pixel, light with 6° incident angle is focused by the microlens and transmitted through the aperture, but does not hit the pixel due to the spacing between back side of microlens and sensor array. Light with 13° incident angle is focused by the microlens but is absorbed by the opaque part of the back side of the microlens.

Figure 17:
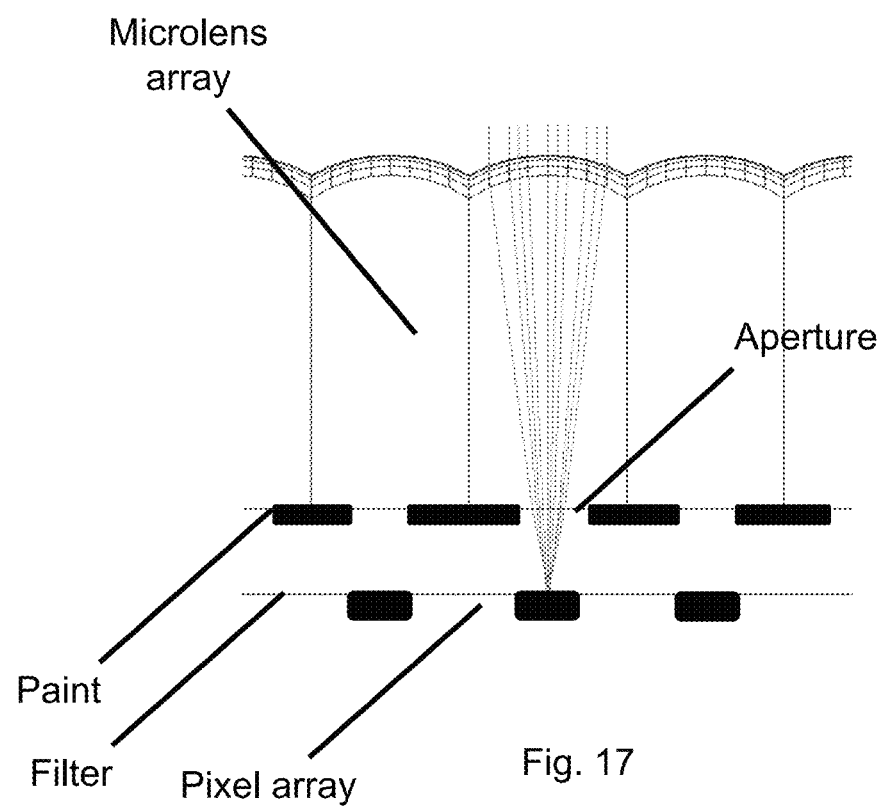
FIG. 17 is a zoomed in view of FIG. 12

FIG. 17 is a close-up view of FIG. 12 showing the situation with 0 degrees incident angle.

Figure 18:
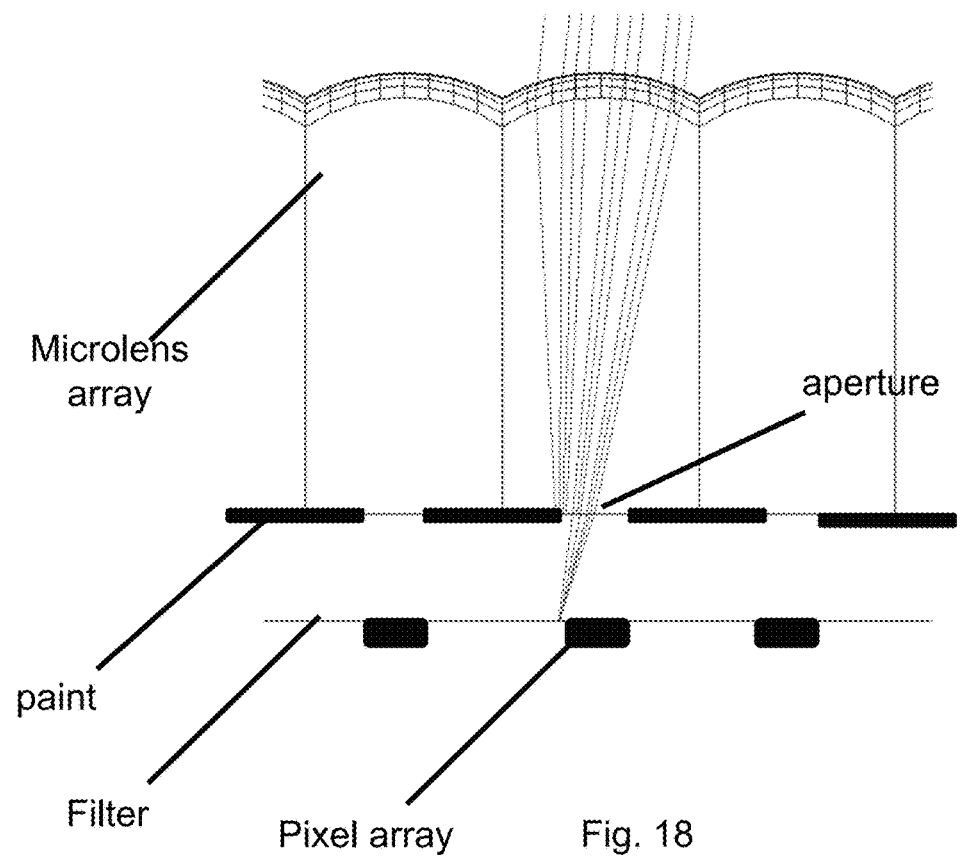
FIG. 18 is a zoomed in view of FIG. 13

FIG. 18 is a close-up view of FIG. 13 showing the situation with 6 degrees incident angle. Part of the focused light is absorbed by the back side of the microlens, part of the focused light is transmitted through the aperture but does not hit the pixel and is therefore not detected.

Figure 19:
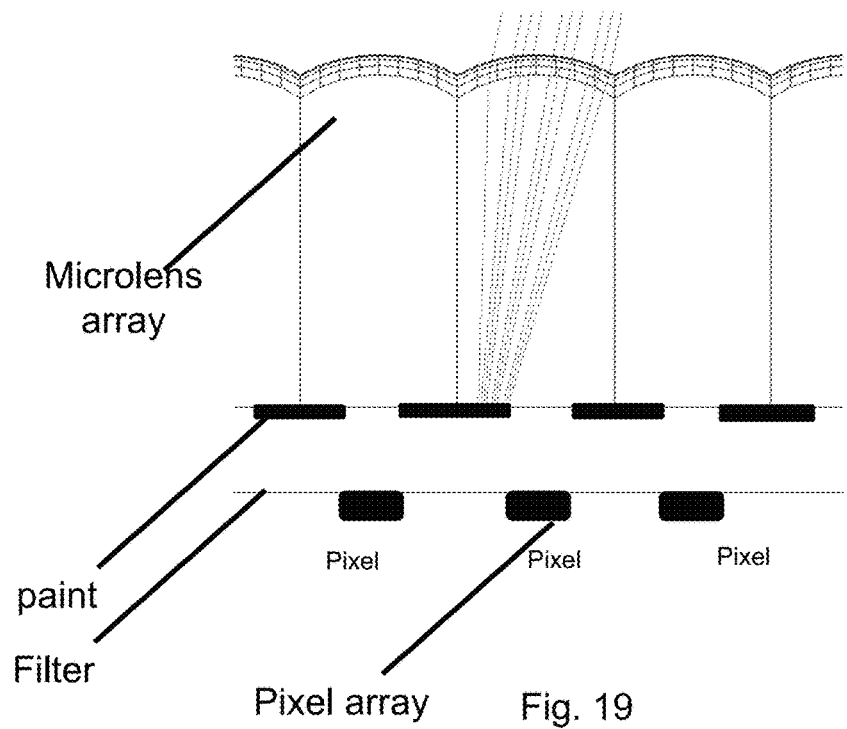
FIG. 19 is a zoomed in view of FIG. 14
Figure 20:
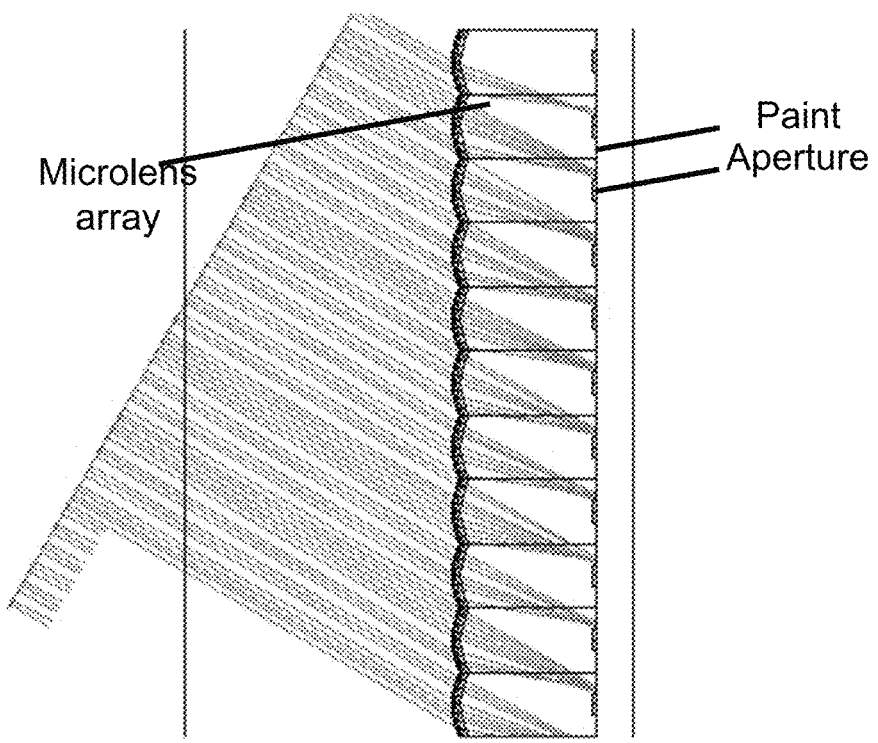
FIG. 20 shows a wavefront of light with 30° incident angle incident on the microlens array shown in FIG. 2. The light is focused by the microlenses but then absorbed by the opaque surfaces.

FIG. 19 is a close-up view of FIG. 14 showing the situation with 13 degrees incident angle FIG. 20 shows a wavefront of light with 30° incident angle incident on the microlens array shown in FIG. 2. The light is focused by the microlenses but then absorbed by the painted back side surfaces.

Figure 21:
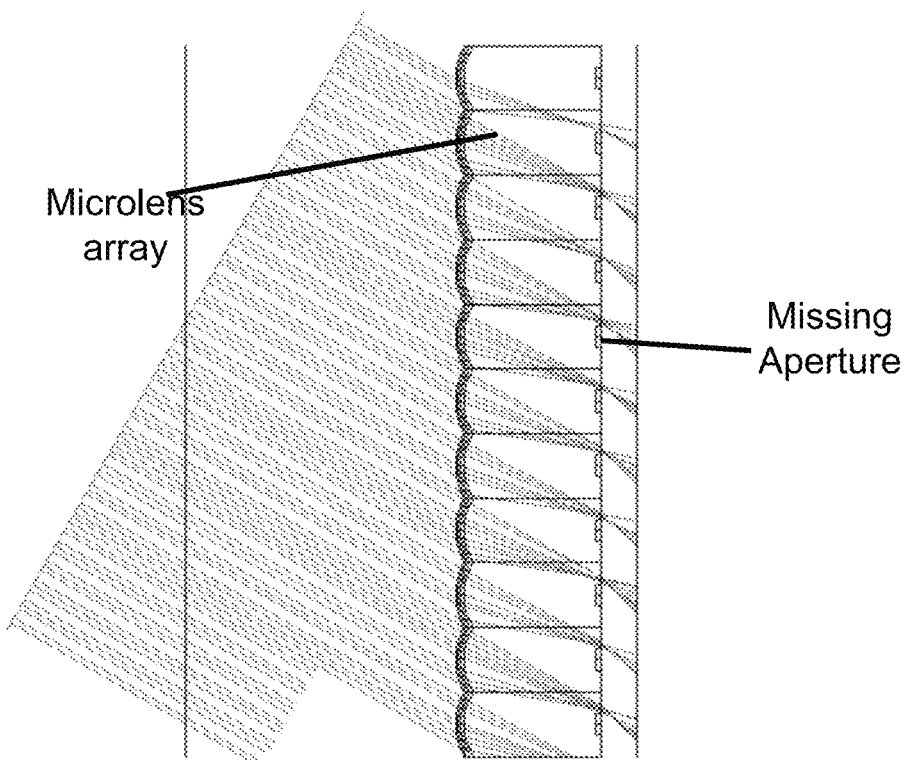
FIG. 21 shows a wavefront of light with 30° incident angle incident on the microlens array shown in FIG. 2, however without the apertures, the entire back surface is transparent.

FIG. 21 shows a wavefront of light with 30° incident angle incident on the microlens array shown in FIG. 2, however without the apertures, the entire back surface is transparent. And then the light is focused by the microlenses and is transmitted to an adjacent pixel, i.e. undesired light with large incident angle is transmitted to the sensor array. This example illustrates the importance of the transparent aperture in the opaque back side, i.e. they help to ensure that only desired light is transmitted to the sensor array.

Figure 22:
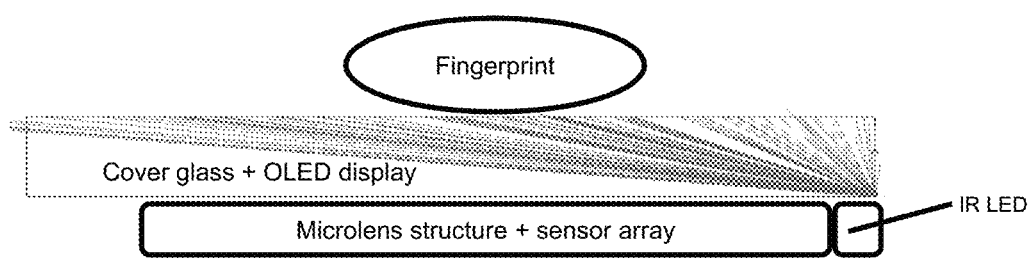
FIG. 22 shows an exemplary configuration of an infrared LED as light source of the fingerprint sensor mounted besides the fingerprint sensor.

FIG. 22 shows an exemplary configuration of an infrared LED as light source of the fingerprint sensor mounted besides the microlens structure+sensor array. The IR LED can be configured to illuminate the touch area which must be sensitive to the fingerprint. An IR LED has a large diverging angle for certain optical structures. The light is guided by the cover glass and thereby distributed appropriately such that there will be sufficient light for the fingerprint detection.

Figure 23:
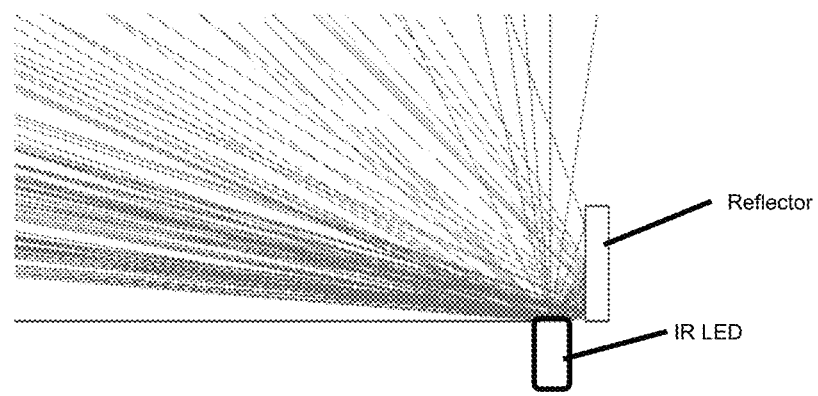
FIG. 23 is a close-up of the configuration of the light source of FIG. 22.

FIG. 23 shows an example where an IR LED is mounted close to a corner or side of a display panel+cover glass. A reflector is provided to reflect light from the IR LED back into the cover glass. In this example the IR LED is mounted spaced from the fingerprint sensor and the cover glass is used as waveguide for the IR light.

Figure 24:
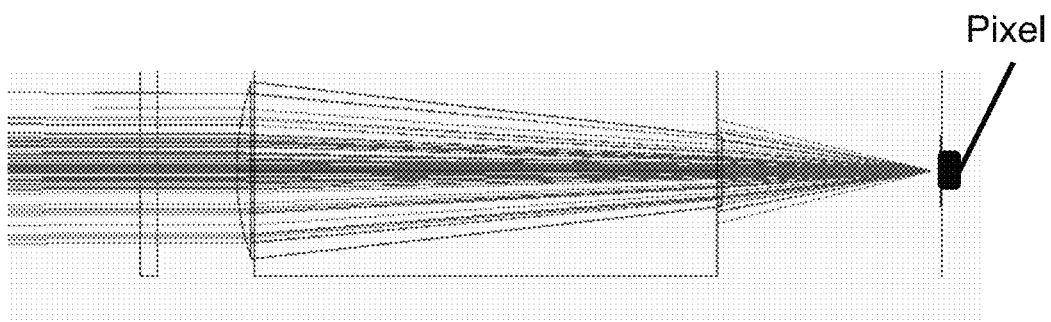
FIG. 24 shows a cut-through side view of a single microlens where a light source is integrated with the pixel to provide co-axial illumination.

FIG. 24 shows a cut-through side view of a single microlens where a light source is integrated with the pixel to provide co-axial illumination, a light source such as a micro-LED. This provides the optimal illumination of a fingerprint, but is not necessarily a cost-efficient solution because it requires a light source for every active pixel. In this case, if the aperture is formed by reflective material as exemplified in FIGS. 1D and 15B, the back side of the reflective material towards the pixel the should be covered by light absorbent material.

Figure 25:
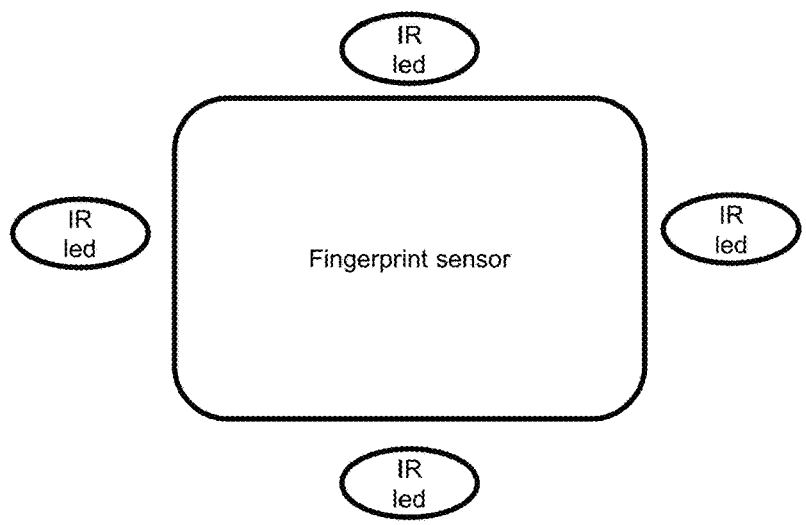
FIG. 25 shows an example with four IR LEDs as light sources mounted around the fingerprint sensor.

FIG. 25 shows an example with four IR LEDs as light sources mounted around the sensor array. This is a preferred solution because it provides a substantial homogeneous illumination of the touch sensitive surface and the solution is still cost-efficient.

Figure 26:
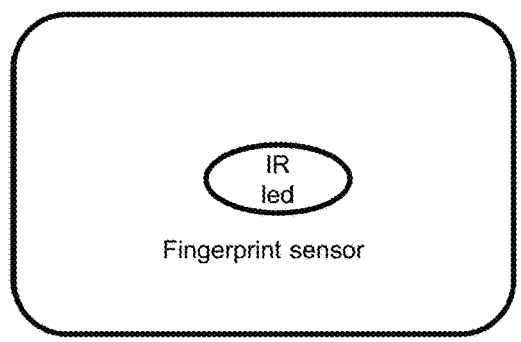
FIG. 26 shows an IR LED is integrated in the fingerprint sensor.

FIG. 26 shows an IR LED is integrated in the fingerprint sensor. This would provide a good illumination, substantially co-axial, of the touch sensitive surface with only one light source. However, it would compromise the detection, because the space required by the light source would be part of the sensor array.

Figure 27:
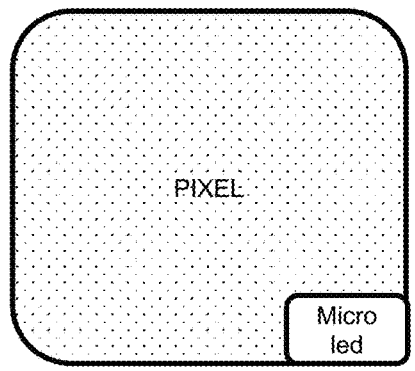
FIG. 27 shows a micro LED integrated in one single pixel to perform co-axial illumination as also illustrated in FIG. 24.

FIG. 27 shows a micro LED integrated in one single pixel to perform co-axial illumination as also illustrated in FIG. 24.

Figure 28:
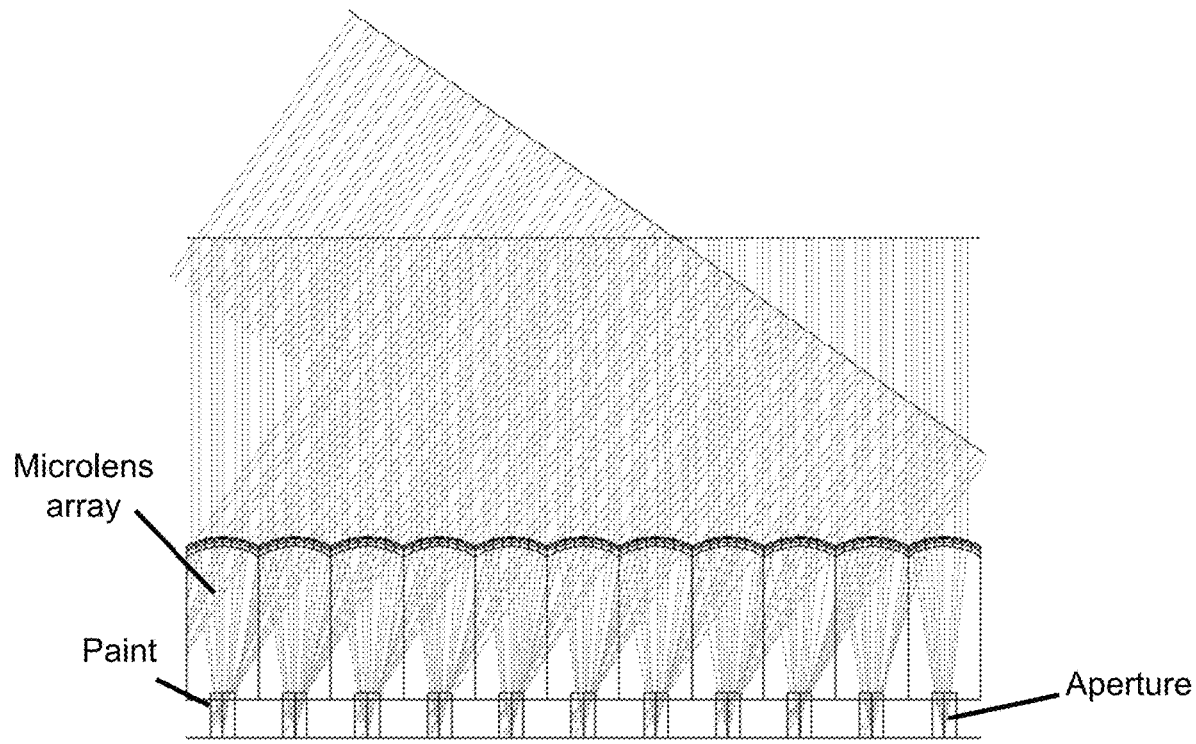
FIG. 28 shows a schematic diagram of a microlens array having an elongated aperture together with two wavefronts having 30° and 0° incident angle.

FIG. 28 shows a schematic diagram of a microlens array having an elongated aperture. In this case the aperture is substantially elongated along an axis perpendicular to the major plane of the microarray structure. Two wavefronts are shown having incidence angles of 30° and 0°, wherein the wavefront with the higher incident angle does not reach the pixels of the sensor array due to being blocked by the opaque paint on the side of the elongated aperture.

Figure 29:
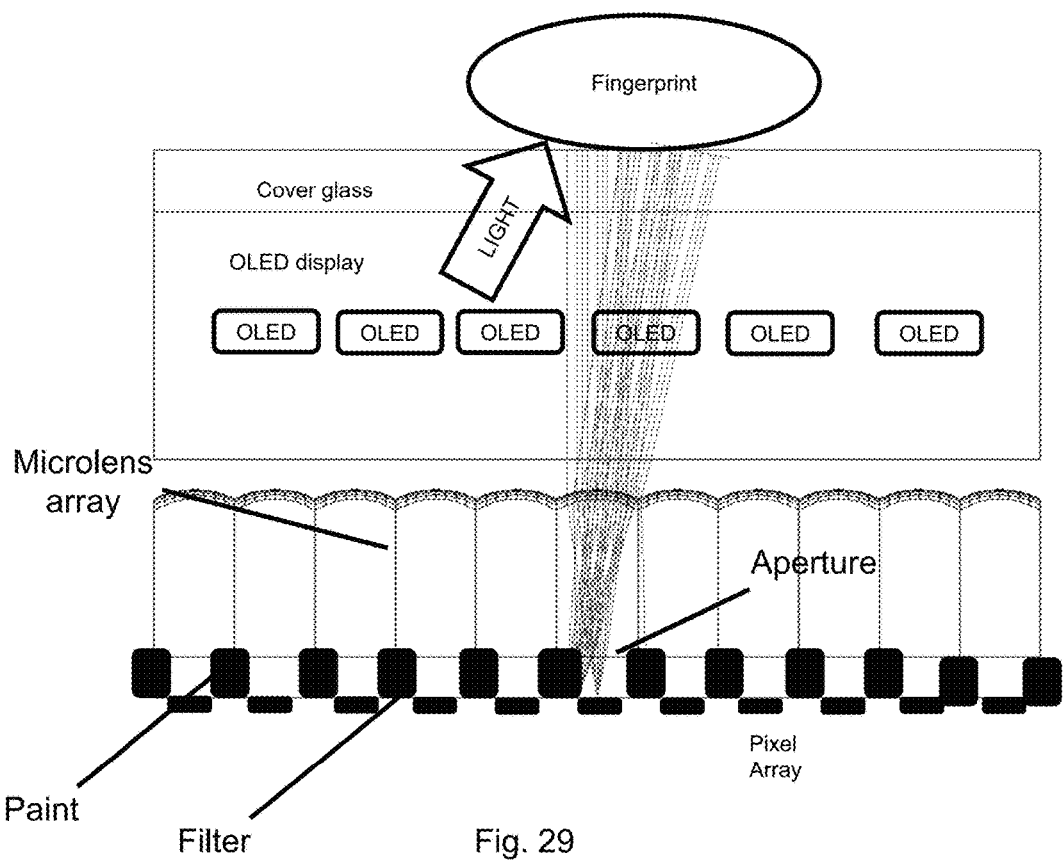
FIG. 29 shows an illustration of the functionality of a microlens array comprising an elongated aperture. Reflected light from fingerprint with 6° incident angle is blocked by the opaque surface acting to form the aperture.

FIG. 29 shows an illustration of the functionality of a microlens array comprising an elongated aperture, wherein the opaque paint makes up the side walls of the elongated aperture. Reflected light from a fingerprint with an incident angle of 6° is blocked by the paint within the elongated aperture. The filter for sorting out undesired wavelengths is shown positioned partly within the elongated aperture.

FIG. 30 shows a schematic diagram for the fabrication of apertures that are aligned with the microlenses. By the application of a photosensitive material on the back side of the microlens array followed by irradiation of said material by collimated light through the microlenses, the photosensitive material may be removed to form apertures aligned with the microlenses. Preferably, the remaining part of the photosensitive material would thereafter constitute the opaque paint which blocks undesired light returned from the object, i.e. returned having a too high incident angle.

FURTHER DETAILS

The present disclosure will in the following be described with in further details with reference to the numbered items.

1. An optical sensor (system) for placement under a display panel for detecting/imaging light returned from an object, such as a fingerprint, on top of the display panel, the optical sensor comprising
    a microlens structure having a front side with an array of light focusing elements and an opaque back side with an array of optically transparent apertures aligned with the focusing elements, and
    a sensor array of optical detectors facing the back side of the microlens structure,
    wherein the optical sensor is configured such that fingerprint light with an incident angle of less than or equal to a predefined value is focused by the microlens structure to the sensor array whereas fingerprint light with an incident angle of more than said predefined value is not detected.
2. The optical sensor according to item 1, wherein the predefined value of the incident angle is 10 degrees, more preferably 8 degrees, even more preferably 6 degrees, most preferably 5 degrees.
3. The optical sensor according to any of the preceding items, wherein the microlenses are identical.
4. The optical sensor according to any of the preceding items, wherein the microlens array is configured such that each of said focusing elements is in optical correspondence with one of said transparent apertures.
5. The optical sensor according to any of the preceding items, configured such that fingerprint light is imaged to the sensor array.
6. The optical sensor according to any of the preceding items, wherein each microlens is configured to focus and/or image fingerprint light to a corresponding pixel on the sensor array.
7. The optical sensor according to any of the preceding items, wherein the microlens structure is configured such that each focusing element is capable of converging fingerprint light through a corresponding transparent aperture.
8. The optical sensor according to any of the preceding items, wherein at least a part of or all of the focusing elements has a spherical surface.
9. The optical sensor according to any of the preceding items, wherein the microlens structure is configured to absorb at least part of the fingerprint light having an incident angle of more said predefined value.
10. The optical sensor according to any of the preceding items, wherein (the surface of) the microlens structure is configured to be light absorbing except for the focusing elements and the transparent apertures which are light transmissive.
11. The optical sensor according to any of the preceding items, wherein opacity of the back side of the microlens array is provided by reflection and/or absorption of light.
12. The optical sensor according to any of the preceding items, wherein the microlens structure is configured to reflect at least part of the fingerprint light having an incident angle of more said predefined value, preferably towards the front side of the microlens array.
13. The optical sensor according to any of the preceding items, wherein reflective material, such as a metal foil, are attached to the back side of the microlens structure to form the transparent apertures.
14. The optical sensor according to any of the preceding items, wherein light incident on the back side (of the inside) of the microlens is either transmitted through the transparent aperture or reflected by the reflective material.
15. The optical sensor according to any of the preceding items, wherein a metal foil, such as an aluminium foil, is attached to the back side of the microlens structure such that the back side of the microlens structure is reflective towards the front side of the microlens structure.
16. The optical sensor according to any of the preceding items 8, wherein the transparent apertures are provided as holes in the metal foil.
17. The optical sensor according to any of the preceding items 15-16, wherein transparent apertures are provided in the metal foil by cutting and/or stamping out holes in the metal foil.
18. The optical sensor according to any of the preceding items, wherein the sensor array comprises only one pixel for each microlens.
19. The optical sensor according to any of the preceding items, wherein a plurality of neighbouring pixels is assembled in groups, and wherein each group of pixels is configured to function as one active pixel.
20. The optical sensor according to any of the preceding items, wherein the sensor array is a CCD, CMOS or an array of photodiodes.
21. The optical sensor according to any of the preceding items, wherein the distance between the front side and the back side of the microlens structure is less than 400 µm, more preferably less than 100 µm, even more preferably less than 75 µm, yet more preferably less than 60 µm, most preferably less than 55 µm.
22. The optical sensor according to any of the preceding items, wherein the focusing elements have a diameter of less than 100 µm, more preferably less than 30 µm, most preferably less than or around 25 µm.
23. The optical sensor according to any of the preceding items, wherein the focusing elements is configured to have a back focal length of less than 30 µm, more preferably less than 15 µm, most preferably less than or approx. 10 µm.
24. The optical sensor according to any of the preceding items, wherein the apertures in the microlens structure have an area of less than 800 µm$^2$, more preferably less than 400 µm$^2$, most preferably less than or around 100 µm$^2$.

25. The optical sensor according to any of the preceding items, wherein the footprint of the microlens structure is less than 400 mm$^2$, more preferably less than 200 mm$^2$, most preferably less than or around 100 mm$^2$.
26. The optical sensor according to any of the preceding items, wherein the sensor array is mounted with a predefined distance to the back side of the microlens array such that the sensor array is spaced from the apertures, for example a predefined distance of between 5 and 30 µm, preferably between 10 and 15 µm.
27. The optical sensor according to any of the preceding items, wherein the sensor array is glued to the microlens structure.
28. The optical sensor according to any of the preceding items, comprising at least one optical filter configured to filter out light of a predefined wavelength range.
29. The optical sensor according to any of the preceding items, further comprising at least one light source for transmitting light towards the front side of the microlens structure.
30. The optical sensor according to item 29, wherein the light source(s) is configured for emitting infrared light.
31. The optical sensor according to item 29, wherein the light source(s) is configured for emitting green light.
32. The optical sensor according to any of items 29-31, wherein said at least one light source is a laser or a LED.
33. The optical sensor according to any of items 29-32, wherein said at least one light source is integrated in the sensor array.
34. The optical sensor according to any of items 29-33, wherein a light source is integrated in each pixel of the sensor array which is in optical correspondence with an aperture of the microlens structure.
35. The optical sensor according to any of the preceding items, configured to utilize light from a light emitting display panel.
36. The optical sensor according to any of the preceding items, wherein the microlens structure is manufactured in a polymeric material by injection moulding.
37. The optical sensor according to any of the preceding items, wherein the microlens structure is manufactured by film pressing.
38. An image recognition device for optically detecting an image, comprising an optical sensor according to any of preceding items and a processing unit for processing the signal from the sensor array.
39. The image recognition device according to item 38 comprising a storage unit for storing image data.
40. An electronic device for optically detecting a fingerprint, comprising
    a display panel comprising a top transparent layer formed over the display panel as an interface for being touched by a user,
    an optical sensor according to any of preceding items 1-37 or an image recognition device according to any of items 38-39.
41. The electronic device according to item 40, wherein the display panel comprises light emitting display pixels, wherein each pixel is configured to emit light for forming a portion of a display image; and wherein the top transparent is configured for transmitting the light from the display panel to display images.
42. A method for detecting light returned from a fingerprint on top of a display panel, comprising the steps of focusing and imaging fingerprint light to a sensor array of optical detectors by means of microlenses arranged in a microlens structure located below the display panel, wherein the fingerprint light is received within a predefined incident angle.
43. The method of item 42, wherein the predefined incident angle is 10 degrees, more preferably 8 degrees, even more preferably 6 degrees, most preferably 5 degrees.

The invention claimed is:
1. A fingerprint optical sensor system for placement under a display panel for detecting and imaging light returned from a fingerprint on top of the display panel, the optical sensor comprising
    a microlens structure having a front side with an array of light focusing elements and an opaque back side with an array of optically transparent apertures aligned with the focusing elements, and
    a sensor array of optical detector pixels facing the back side of the microlens structure, wherein each aperture is aligned with at least one of said optical detector pixels,
    wherein the fingerprint optical sensor system is configured for focusing by the microlens structure light returned from the fingerprint with an incident angle of less than or equal to a predefined value onto the sensor array, and for preventing detection of light returned from the fingerprint with an incident angle of more than said predefined value.
2. The optical sensor system according to claim 1, wherein the predefined value of the incident angle is 10 degrees.
3. The optical sensor system according to claim 1, wherein the predefined value of the incident angle is 5 degrees.
4. The optical sensor system according to claim 1, wherein each focusing element is configured to focus and/or image returned light to at least one corresponding pixel on the sensor array.
5. The optical sensor system according to claim 1, wherein the microlens structure is configured to absorb at least part of the returned light having an incident angle of more said predefined value.
6. The optical sensor system according to claim 1, wherein the microlens structure is configured to reflect at least part of the returned light having an incident angle of more said predefined value towards the front side of the microlens array.
7. The optical sensor system according to claim 1, wherein reflective material are attached to the back side of the microlens structure to form the transparent apertures and such that light incident on the back side of the inside of the microlens is either transmitted through the transparent aperture or reflected by the reflective material.
8. The optical sensor system according to claim 1, wherein a metal foil is attached to the back side of the microlens structure such that the back side of the microlens structure is reflective towards the front side of the microlens structure.
9. The optical sensor system according to claim 8, wherein the transparent apertures are provided as holes in the metal foil.
10. The optical sensor system according to claim 1, wherein the sensor array comprises only one pixel for each focusing element.
11. The optical sensor system according to claim 1, wherein a plurality of neighbouring pixels of the sensor array is assembled in groups.

12. The optical sensor system according to claim 1, wherein the distance between the front side and the back side of the microlens structure is less than 400 μm or less than 100 μm.

13. The optical sensor system according to claim 1, wherein the focusing elements have a diameter of less than 100 μm or less than 30 μm.

14. The optical sensor system according to claim 1, wherein the focusing elements is configured to have a back focal length of less than 30 μm or less than 15 μm.

15. The optical sensor system according to claim 1, wherein the apertures in the microlens structure have an area of less than 800 μm$^2$ or less than 200 μm$^2$.

16. The optical sensor system according to claim 1, wherein the sensor array is mounted with a predefined distance to the back side of the microlens array such that the sensor array is spaced from the apertures.

17. The optical sensor system according to claim 1, further comprising at least one infrared light source for transmitting light towards the front side of the microlens structure such that IR light is incident on the fingerprint on top of the display panel.

18. The optical sensor system according to claim 1, configured to utilize light from a light emitting display panel.

19. The optical sensor system according to claim 1, wherein the microlens structure comprises a polymeric material.

20. An image recognition device, comprising an optical sensor system according to claim 1, a storage unit for storing image information and a processing unit for processing the signal from the sensor array in order to recognize an image.

* * * * *